United States Patent
Inoue et al.

(10) Patent No.: US 7,277,942 B2
(45) Date of Patent: ***Oct. 2, 2007

(54) SCHEME FOR INFORMATION DELIVERY TO MOBILE COMPUTERS USING CACHE SERVERS

(75) Inventors: Atsushi Inoue, Kanagawa (JP); Eiji Kamagata, Kanagawa (JP); Noriyasu Kato, Kanagawa (JP); Naohisa Shibuya, Saitama (JP); Yoshinari Kumaki, Kanagawa (JP); Yasuro Shobatake, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 203 days.

This patent is subject to a terminal disclaimer.

(21) Appl. No.: 11/038,365

(22) Filed: Jan. 21, 2005

(65) Prior Publication Data
US 2005/0132049 A1 Jun. 16, 2005

Related U.S. Application Data

(63) Continuation of application No. 09/533,944, filed on Mar. 23, 2000, now Pat. No. 6,874,017.

(30) Foreign Application Priority Data
Mar. 24, 1999 (JP) ................... 11-080267

(51) Int. Cl.
*G06F 15/173* (2006.01)
*H04L 12/58* (2006.01)

(52) U.S. Cl. ............... 709/225; 709/217.226; 455/412.1

(58) Field of Classification Search ........... 709/203, 709/216–219, 223–229; 455/412.1, 414.3, 455/456.3
See application file for complete search history.

(56) References Cited

U.S. PATENT DOCUMENTS
5,511,208 A * 4/1996 Boyles et al. ............... 709/223

(Continued)

FOREIGN PATENT DOCUMENTS
| EP | 0 853 287 A2 | 7/1998 |
| JP | 08-331153 A | 12/1996 |
| JP | 09-313300 A | 12/1997 |

OTHER PUBLICATIONS

Wu et al., "Caching Location Data in Mobile Networking", Oct. 1993, pp. 71-76.

(Continued)

*Primary Examiner*—William Vaughn
*Assistant Examiner*—Yasin M Barqadle
(74) *Attorney, Agent, or Firm*—Foley & Lardner LLP

(57) ABSTRACT

In the disclosed information delivery scheme for delivering WWW information provided by information servers on the Internet to mobile computers connected to the Internet through a wireless network, a plurality of cache servers capable of caching WWW information provided by the information servers are provided in association with the wireless network. The cache servers can be managed by receiving a message indicating at least a connected location of a mobile computer in the wireless network from the mobile computer, selecting one or more cache servers located nearby the mobile computer according to the message, and controlling these one or more cache servers to cache selected WWW information selected for the mobile computer, so as to enable faster accesses to the selected WWW information by the mobile computer. Also, the cache servers can be managed by selecting one or more cache servers located within a geographic range defined for an information provider who provides WWW information from an information server, and controlling these one or more cache servers to cache selected WWW information selected for the information provider, so as to enable faster accesses to the selected WWW information by the mobile computer.

1 Claim, 18 Drawing Sheets

U.S. PATENT DOCUMENTS

| | | | |
|---|---|---|---|
| 5,572,221 A | | 11/1996 | Marlevi et al. |
| 5,727,159 A | | 3/1998 | Kikinis |
| 5,742,905 A | | 4/1998 | Pepe et al. |
| 5,825,759 A | | 10/1998 | Liu |
| 5,826,039 A | * | 10/1998 | Jones .................... 709/206 |
| 5,860,131 A | | 1/1999 | Daub |
| 5,963,550 A | | 10/1999 | Hirata et al. |
| 6,167,438 A | | 12/2000 | Yates et al. |
| 6,212,392 B1 | | 4/2001 | Fitch et al. |
| 6,246,672 B1 | | 6/2001 | Lumelsky |
| 6,311,058 B1 | * | 10/2001 | Wecker et al. ............. 455/418 |
| 6,332,127 B1 | * | 12/2001 | Bandera et al. ............. 705/14 |
| 6,356,761 B1 | * | 3/2002 | Huttunen et al. ........ 455/456.1 |
| 6,370,620 B1 | | 4/2002 | Wu et al. |
| 6,408,181 B1 | | 6/2002 | Ho et al. |
| 6,434,609 B1 | | 8/2002 | Humphrey |
| 6,473,609 B1 | | 10/2002 | Schwartz et al. |

OTHER PUBLICATIONS

Levine et al., "A Resource Estimation and Call Admission Algorithm for Wireless Multimedia Networks Using the Shadow Cluster Concept", Feb. 1997, pp. 1-12.

Hadjiefthymiades et al., "A Resource Management Scheme for Efficient WWW Computing in Wireless Communications", Sep. 1999, pp. 1755-1759.

* cited by examiner

FIG.7A

| SPONSOR ID | CACHING RANGE | CACHE DATA AMOUNT | CACHE UPDATE FREQUENCY |
|---|---|---|---|
|  |  |  |  |

PREMIER SPONSOR DATABASE FORMAT

FIG.7B

| SPONSOR ID | CACHING RANGE | CACHE DATA AMOUNT | CACHE UPDATE FREQUENCY |
|---|---|---|---|
| URL1 | SERVER A, B, C | PAGE A1.....A10 | 6 HOURS |
| URL2 | SERVER D, E, F | PAGE B1.....B5 | 24 HOURS |
| URL3 | SERVER G | PAGE C1.....C5 | 24 HOURS |
| URL4 | SERVER H | PAGE D1 | 72 HOURS |
|  |  |  |  |

EXEMPLARY PREMIER SPONSOR DATABASE

FIG.8

| USER ID | CACHING ORDER | CONNECTED CELL ID | NEARBY CACHE SERVER ID |
|---|---|---|---|
|  |  |  |  |

PREMIER USER DATABASE FORMAT

FIG.16
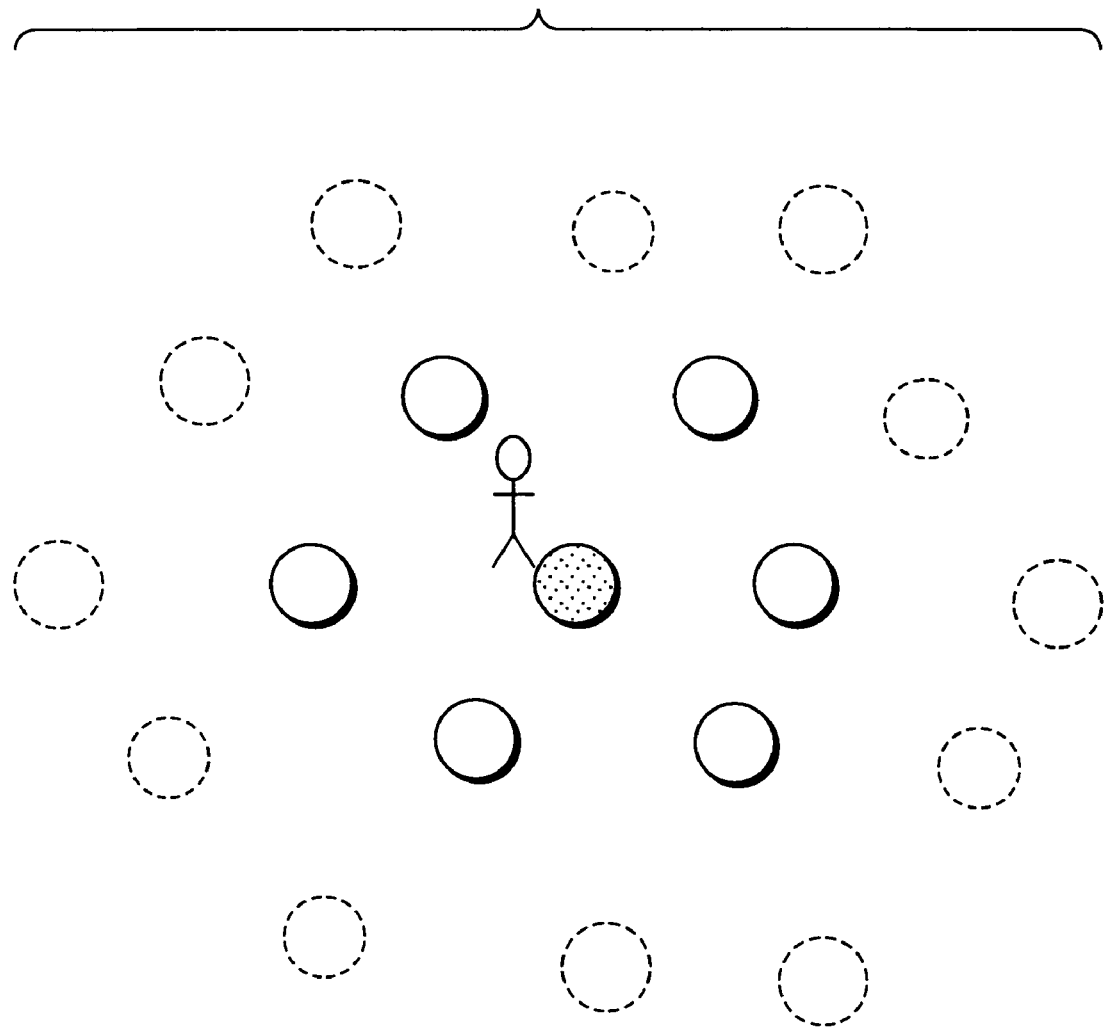
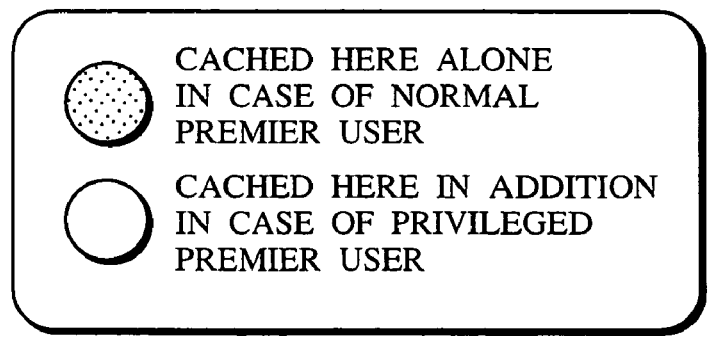

FIG.18

| USER ID | CACHING ORDER | CONNECTED CELL ID | NEARBY CACHE SERVER ID | HIGH PRIORITY PAGE |
|---|---|---|---|---|
| | | | | |

FIG.19

| USER ID | CACHING ORDER | CONNECTED CELL ID | NEARBY CACHE SERVER ID | RELATED SPONSOR INFORMATION |
|---|---|---|---|---|
| | | | | |

FIG.20

| SPONSOR ID | CACHING RANGE | CACHE DATA AMOUNT | CACHE UPDATE FREQUENCY | PUSH DATA |
|---|---|---|---|---|
| | | | | |

FIG.21

| SPONSOR ID | CACHING RANGE | CACHE DATA AMOUNT | CACHE UPDATE FREQUENCY | SPECIFIED USER ID |
|---|---|---|---|---|
| | | | | |

SCHEME FOR INFORMATION DELIVERY TO MOBILE COMPUTERS USING CACHE SERVERS

The present application is a continuation of U.S. application Ser. No. 09/533,944, filed Mar. 23, 2000, now U.S. Pat. No. 6,874,017 which claims priority from Japanese Patent Application No. 11-080267, filed Mar. 24, 1999. The entire contents of both applications are incorporated herein by reference.

BACKGROUND OF THE INVENTION

1. Field of the Invention

The present invention relates to a scheme for information delivery to mobile computers which enables mobile computers to acquire WWW (World Wide Web) information from WWW information servers through wireless accesses.

2. Description of the Background Art

In conjunction with the development of smaller and cheaper computer systems and improved network environment, the use of computer systems has rapidly spread to various fields, and in particular the use of the world's largest computer network called the Internet has spread in recent years such that many people are now accessing the Internet to utilize information or services available on the Internet.

On the other hand, in conjunction with the spread of such networks, the technique of the mobile computing has been developing actively. In the mobile computing, a user who carries a portable terminal or computer carries out communications while moving over networks. There are cases where a user's location on networks changes while communications are carried out, and for the communication access from a visited site, not only the conventionally used wired networks but also wireless networks such as those of the cellular telephone and the PHS (Personal Handy phone System) can be utilized.

On the Internet, the information delivery scheme in the hypertext format called WWW is mainly utilized. This is a scheme which uses the language called HTML (HyperText Markup Language) by which links can be set up between mutually related information such that one can Jump from one information (Web page) to another easily. Also, by using this WWW, it is possible to realize information exchanges in diverse forms such that, besides a simple information providing from a WWW server, it is possible for a WWW server to receive inputs (such as answers to questionnaire, ticket reservations, orders for commercial goods) from users on client devices (terminals or computers), and it is also possible to send information using image data and speech data. Consequently, it is possible to construct a framework for the electronic commerce, for example.

Accesses to the WWW are basically realized by communications between a client device and a WWW server using the TCP/HTTP protocol. However, in general, if accesses to all relevant WWW servers are made in response to access requests with respect to various WWW pages issued from various client devices, the amount of traffics on the networks would become enormous and the network bandwidth would be wasted, so that a longer access response time would be required. Also, when many accesses are concentrated on a specific WWW server, the performance of that WWW server can be degraded.

In order to avoid these problems, there is a provision to provide cache servers (also called proxy servers) for caching (temporarily storing) necessary WWW page contents nearby client devices. In this provision, it becomes unnecessary to carry out communications with WWW servers for every access, by constantly maintaining popular, high hit rate (frequently accessed) pages in the cache servers, so that the traffics can be reduced and the response time can be shortened. This cache scheme is particularly effective when the network bandwidth on the terminal side is limited as in the case of using a portable terminal via wireless accesses.

As described above, in the case of the mobile access to the Web via the Internet using a wireless portable terminal, if accesses to the WWW servers are made every time, the response time would become long so that it cannot be expected to utilize information services comfortably because the wireless network bandwidth on the terminal device side is limited.

In order to avoid this problem, there is a need to cache Web pages in cache servers provided on an access route so as to shorten the response time and reduce the amount of traffics on the network.

In such an information delivery system, one or a plurality of cache server devices are provided on appropriate locations on the network, and a suitable amount of Web page contents information is stored in a memory region of each cache server. Depending on the need, it is also necessary to access original Web servers regularly in order to update the information maintained on the cache server. In this case, a policy regarding how the caching should be carried out becomes important because the memory region on the cache server is finite.

In this regard, various cache update policies have been proposed, including a method for coordinating a plurality of cache servers. For instance, in the IETF and W3C which are the standardization organizations for the Internet and the WWW, a protocol called Internet Cache Protocol for enabling cache servers to exchange copies of contents has been standardized.

However, what have been proposed so far are all general cache update policies, and there has been no available technique for realizing effective caching with respect to specific users who make mobile accesses using wireless portable terminals or mobile access users located at specific locations.

For example, in the case of receiving the information delivery service during seamless movements using a wireless connected mobile portable terminal, there can be cases where it is desired to receive geographically relevant information at higher speed or cases where it is desired to deliver geographically relevant information at higher speed with respect to users of mobile portable terminals. Examples of such cases includes a case where it is desired to receive information sent out by stores belonging to a shopping district at higher speed while moving through that shopping district, and a case where it is desired to deliver information specific to a particular area of a big shopping mall at higher speed to those users who have entered that particular area while moving through the shopping mall. There can also be a case where it is desired to cache Web pages that are highly likely to be accessed by a user of a mobile portable terminal at high priority, according to the preferences of the individual user.

However, it has been impossible to realize such services conventionally.

SUMMARY OF THE INVENTION

It is therefore an object of the present invention to provide an information delivery scheme capable of realizing effective caching with respect to specific users who make mobile accesses using mobile computers.

It is another object of the present invention to provide an information delivery scheme capable of realizing effective caching with respect to mobile access users located at locations specified by specific information providers.

According to one aspect of the present invention there is provided an information delivery system for delivering WWW information provided by information servers on Internet to mobile computers connected to the Internet through a wireless network, comprising: a plurality of cache servers provided in association with the wireless network and configured to be capable of caching WWW information provided by the information servers; and a management unit configured to manage caching state of the cache servers, by receiving a message indicating at least a connected location of a mobile computer in the wireless network from the mobile computer, selecting one or more cache servers located nearby the mobile computer according to the message, and controlling said one or more cache servers to cache selected WWW information selected for the mobile computer, so as to enable faster accesses to the selected WWW information by the mobile computer.

According to another aspect of the present invention there is provided an information delivery system for delivering WWW information provided by information servers on Internet to mobile computers connected to the Internet through a wireless network, comprising: a plurality of cache servers provided in association with the wireless network and configured to be capable of caching WWW information provided by the information servers; and a management unit configured to manage caching state of the cache servers, by selecting one or more cache servers located within a geographic range defined for an information provider who provides WWW information from an information server, and controlling said one or more cache servers to cache selected WWW information selected for the information provider, so as to enable faster accesses to the selected WWW information by the mobile computer.

According to another aspect of the present invention there is provided a method for delivering WWW information provided by information servers on Internet to mobile computers connected to the Internet through a wireless network, using a plurality of cache servers provided in association with the wireless network and configured to be capable of caching WWW information provided by the information servers, the method comprising the steps of: receiving a message indicating at least a connected location of a mobile computer in the wireless network from the mobile computer; selecting one or more cache servers located nearby the mobile computer according to the message; and controlling said one or more cache servers to cache selected WWW information selected for the mobile computer, so as to enable faster accesses to the selected WWW information by the mobile computer.

According to another aspect of the present invention there is provided a method for delivering WWW information provided by information servers on Internet to mobile computers connected to the Internet through a wireless network, using a plurality of cache servers provided in association with the wireless network and configured to be capable of caching WWW information provided by the information servers, the method comprising the steps of: selecting one or more cache servers located within a geographic range defined for an information provider who provides WWW information from an information server; and controlling said one or more cache servers to cache selected WWW information selected for the information provider, so as to enable faster accesses to the selected WWW information by the mobile computer.

According to another aspect of the present invention there is provided a management device for use in an information delivery system for delivering WWW information provided by information servers on Internet to mobile computers connected to the Internet through a wireless network, using a plurality of cache servers provided in association with the wireless network and configured to be capable of caching WWW information provided by the information servers, the management device comprising: a first unit configured to receive a message indicating at least a connected location of a mobile computer in the wireless network from the mobile computer; a second unit configured to select one or more cache servers located nearby the mobile computer according to the message; and a third unit configured to control said one or more cache servers to cache selected WWW information selected for the mobile computer, so as to enable faster accesses to the selected WWW information by the mobile computer.

According to another aspect of the present invention there is provided a management device for use in an information delivery system for delivering WWW information provided by information servers on Internet to mobile computers connected to the Internet through a wireless network, using a plurality of cache servers provided in association with the wireless network and configured to be capable of caching WWW information provided by the information servers, the management device comprising: a first unit configured to select one or more cache servers located within a geographic range defined for an information provider who provides WWW information from an information server; and a second unit configured to control said one or more cache servers to cache selected WWW information selected for the information provider, so as to enable faster accesses to the selected WWW information by the mobile computer.

According to another aspect of the present invention there is provided a mobile computer device for use in an information delivery system for delivering WWW information provided by information servers on Internet to mobile computers connected to the Internet through a wireless network, using a plurality of cache servers provided in association with the wireless network and configured to be capable of caching WWW information provided by the information servers, the mobile computer device comprising: a first unit configured to maintain a user ID of a user of the mobile computer device; a second unit configured to obtain a connected location information regarding a connection location of the mobile computer device in the wireless network; and a third unit configured to notify a message containing at least the user ID and the connection location information, to a management device for managing caching state of the cache servers, such that the message causes the management device to select one or more cache servers located nearby the mobile computer device according to the message and control said one or more cache servers to cache selected WWW information selected for the mobile computer device, so as to enable faster accesses to the selected WWW information by the mobile computer device.

According to another aspect of the present invention there is provided a cache server device for use in an information delivery system for delivering WWW information provided by information servers on Internet to mobile computers connected to the Internet through a wireless network, using a plurality of cache servers provided in association with the wireless network, the cache server device comprising: a cache memory configured to cache WWW information provided by the information servers; and a caching processing unit configured to acquire selected WWW information selected for a mobile computer from the information servers and store the selected WWW information into the cache memory, when the cache server device is included in one or more cache servers located nearby the mobile computer according to a message indicating at least a connection location of the mobile computer in the wireless network which is sent by the mobile computer, so as to enable faster accesses to the selected WWW information by the mobile computer.

According to another aspect of the present invention there is provided a cache server device for use in an information delivery system for delivering WWW information provided by information servers on Internet to mobile computers connected to the Internet through a wireless network, using a plurality of cache servers provided in association with the wireless network, the cache server device comprising: a cache memory configured to cache WWW information provided by the information servers; ane a caching processing unit configured to acquire from an information server selected WWW information selected for an information provider who provides WWW information from the information server and store the selected WWW information into the cache memory, when the cache server device is included in one or more cache servers located within a geographic range defined for the information provider, so as to enable faster accesses to the selected WWW information by the mobile computer.

According to another aspect of the present invention there is provided a method for providing a caching service with respect to a specific user in a system for delivering WWW information provided by information servers on Internet to mobile computers connected to the Internet through a wireless network, the method comprising the steps of: registering the specific user as a premier user in an information delivery system having a plurality of cache servers provided in association with the wireless network and configured to be capable of caching WWW information provided by the information servers; and upon receiving a message indicating at least a connected location of a mobile computer in the wireless network from the mobile computer operated by the specific user, selecting one or more cache servers located nearby the mobile computer according to the message and controlling said one or more cache servers to cache selected WWW information selected for the specific user, so as to enable faster accesses to the selected WWW information by the mobile computer.

According to another aspect of the present invention there is provided a method for providing a caching service with respect to a specific information provider in a system for delivering WWW information provided by information servers on Internet to mobile computers connected to the Internet through a wireless network, the method comprising the steps of: registering the specific information provider who provides WWW information from an information server as a premier sponsor in an information delivery system having a plurality of cache servers provided in association with the wireless network and configured to be capable of caching WWW information provided by the information servers; and selecting one or more cache servers located within a geographic range defined for the specific information provider, and controlling said one or more cache servers to cache selected WWW information selected for the specific information provider, so as to enable faster accesses to the selected WWW information by the mobile computer.

Other features and advantages of the present invention will become apparent from the following description taken in conjunction with the accompanying drawings.

BRIEF DESCRIPTION OF THE DRAWINGS

FIG. 7A is a diagram showing an exemplary format of a premier sponsor database used in the management device of FIG. 6.

FIG. 7B is a diagram showing an exemplary content of a premier sponsor database used in the management device of FIG. 6.

FIG. 8 is a diagram showing an exemplary format of a premier user database used in the management device of FIG. 6.

FIG. 16 is a diagram for explaining another exemplary operation for a caching service with respect to premier users that can be realized by the information delivery system of FIG. 1.

FIG. 18 is a diagram showing another exemplary format of a premier user database that can be used in the management device of FIG. 6.

FIG. 19 is a diagram showing still another exemplary format of a premier user database that can be used in the management device of FIG. 6.

FIG. 20 is a diagram showing another exemplary format of a premier sponsor database that can be used in the management device of FIG. 6.

FIG. 21 is a diagram showing still another exemplary format of a premier sponsor database that can be used in the management device of FIG. 6.

DETAILED DESCRIPTION OF THE PREFERRED EMBODIMENTS

Referring now to FIG. 1 to FIG. 22, the preferred embodiments of the information delivery scheme according to the present invention will be described in detail.

The present invention applies to an information delivery system formed by mobile terminal devices, WWW servers and cache servers, in which a mobile terminal device (mobile computer) is connected to the Internet through the cache server via a wireless access network in order to receive services such as acquisition of WWW information (Web page data) provided by WWW servers on the Internet.

Figure 1:
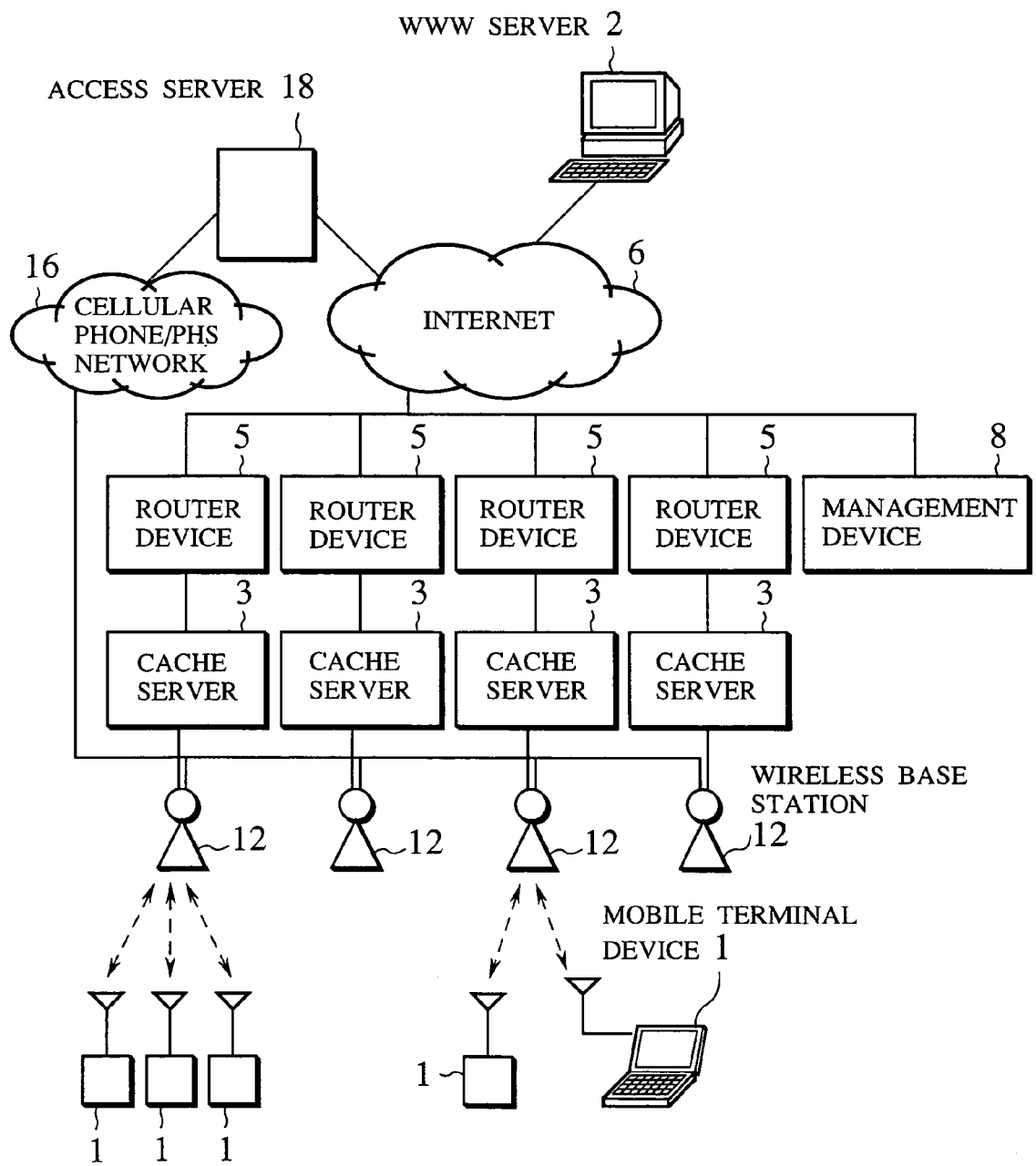
FIG. 1 is a diagram showing an exemplary overall configuration of an information delivery system according to one embodiment of the present invention.

FIG. 1 shows an exemplary network configuration to which the present invention is applicable. FIG. 1 shows only one WWW server 2 but there are actually plural WWW servers on the Internet 6.

In the example of FIG. 1, a mobile terminal device 1 can be connected to a WWW server 2 on the Internet 6 either through a route of wireless base station 12→cache server 3→router device 5→Internet 6, or through a route of wireless base station 12→cellular phone or PHS network 16→access server 18→Internet 6, but the former case will be described in the following.

Note that router devices 5, a management device 8, and cache servers 3 belong to a wireless service provider's network. Also, an access server 18 is a connection device for a dial-up connection or the like which belongs to an Internet service provider.

As shown in FIG. 1, the router devices 5 are provided in correspondence to wireless base stations 12 that terminate wireless sections.

The cache servers 3 are to be provided in association with the wireless base stations 12. Note that there may be some wireless base stations 12 for which the cache server 3 is not provided, and there may be another cache server hierarchically provided on an upstream side (a side closer to the Internet) of the cache servers 3 that are provided in association with the wireless base stations 12. Namely, a plurality of cache servers are to be distributedly provided on the wireless service provider's network, including the cache servers 3 associated with the wireless base stations 12. In this embodiment, however, it is assumed that the cache servers 3 and the wireless base stations 12 are in one-to-one correspondence. The case of providing a higher level cache server on the upstream side will be mentioned in the following description.

Figure 2:
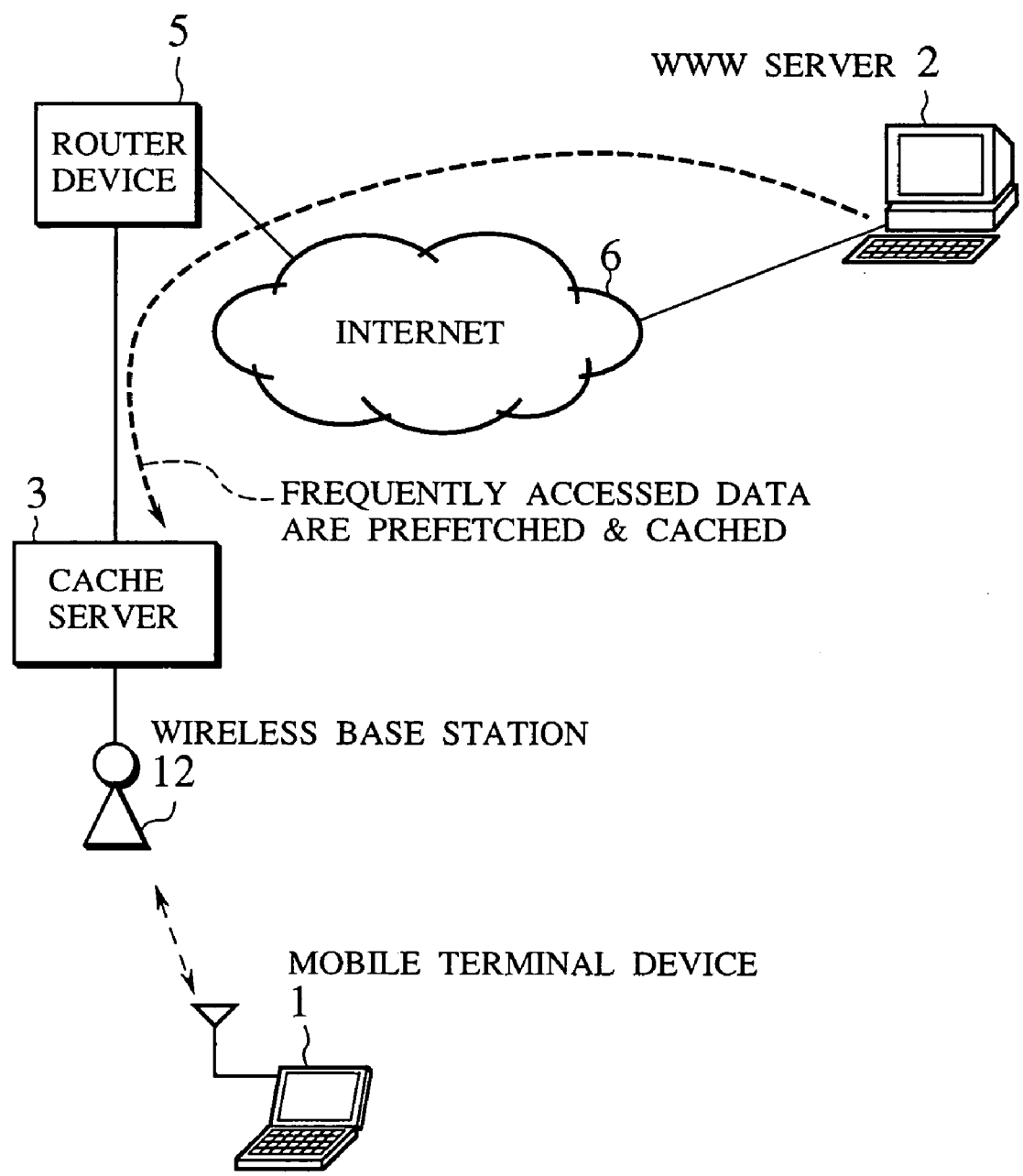
FIG. 2 is a diagram for explaining a basic processing for caching WWW pages in the information delivery system of FIG. 1.

As described in further detail below, the cache server 3 is used for caching prescribed WWW information in advance, mainly with respect to a mobile terminal device 1 connected to the wireless base station 12 corresponding to this cache server 3, as shown in FIG. 2.

When the higher level cache server is provided on the upstream side of the cache server 3 associated with the wireless base station 12, for example, the cache server 3 corresponding to the wireless base station 12 will be conceived as a (relatively) fast, small capacity, primary prefetch cache and the higher level cache server on its upstream side will be conceived as a (relatively) slow, large capacity, secondary prefetch cache, from a viewpoint of the mobile terminal device 1. It is also possible to consider the case where the cache servers 3 associated with the wireless base stations 12 cooperate with each other.

Note that, apart from the above described function, the cache server 3 may also has a firewall function for carrying out an address translation (NAT) processing in the case where the terminal device is located within a network operated by the private addresses and preventing improper accesses from the external, or a cache function based on another scheme (a function for maintaining the WWW information requested by the terminal device in the past, according to the need, for example). As such, the cache server 3 may have various functions, but the following description will mostly focus on the function for caching certain WWW information in advance.

As described in further detail below, the management device 8 controls which WWW information should be cached into which cache server 3. Here, it is assumed that the management device 8 belongs to the wireless service provider, and carries out communications with the cache servers 3 and the wireless base stations 12, where such communications may be realized via the router devices 5 or by providing dedicated lines separately.

In such a network configuration, the communications are carried out between the mobile terminal device 1 connected to the Internet 6 via the wireless access network and the WWW server 2 provided on the Internet 6, so as to realize the transfer of the WWW information or the display of the Web page content on the mobile terminal device 1.

In such a case, if the WWW content requested by the mobile terminal device 1 is stored in the cache server 3 corresponding to the wireless base station 12 to which the mobile terminal device 1 is connected, it is possible to transfer that WWW content from the cache server 3 to the mobile terminal device 1 such that the response time can be shortened and the amount of traffics on the network can be reduced.

Also, the cache servers 3 can cooperate with each other in such a manner that, when the WWW information requested by the mobile terminal device 1 is not cached in one cache server 3, an attempt to acquire this WWW information from another cache server 3 associated with another geographically nearby wireless base station 12 is made, rather than acquiring this WWW information from the corresponding WWW server 2 immediately. When such a cooperation among the cache servers is adopted, advantages of the second best policy can be obtained as long as the WWW content is stored in some of the cooperating cache servers 3.

In the following, the mobile terminal device 1, the WWW server 2, and the cache server 3 will be mainly described for an exemplary network configuration of FIG. 1, but the present-invention is also applicable to a network configuration different from that of FIG. 1, as long as the cache server 3 associated with the wireless base station 12 is provided between the mobile terminal device 1 and the WWW server 2.

Now, in this information delivery system, the user can acquire various WWW information described in HTML by accessing the WWW server 2 on the Internet 6 via the wireless medium such as cellular phone or PHS from the mobile terminal device 1.

As mentioned above, in the WWW information, it is possible to set up links between mutually related information, so that one can easily jump from one WWW information (Web page) to another. In general, a certain Web page is used as an entry (top page) such that the user accesses the desired top page first, selects a link to a desired related page on the displayed top page, and click a corresponding portion (such as a display portion of character string or image) using the mouse, which causes the acquisition and the display of the corresponding related page. It is designed such that the user can reach the desired information by jumping through pages sequentially by appropriately repeating a simple operation of selecting and clicking a link to a desired related page on the displayed page.

Also, by using this WWW, it is possible to realize information exchanges in diverse forms such that, besides a simple information providing from a WWW server, it is possible for a WWW server to receive inputs (such as answers to questionnaire, ticket reservations, orders for commercial goods) from users on client devices (terminals or computers), and it is also possible to send information using image data and speech data.

Figure 3:
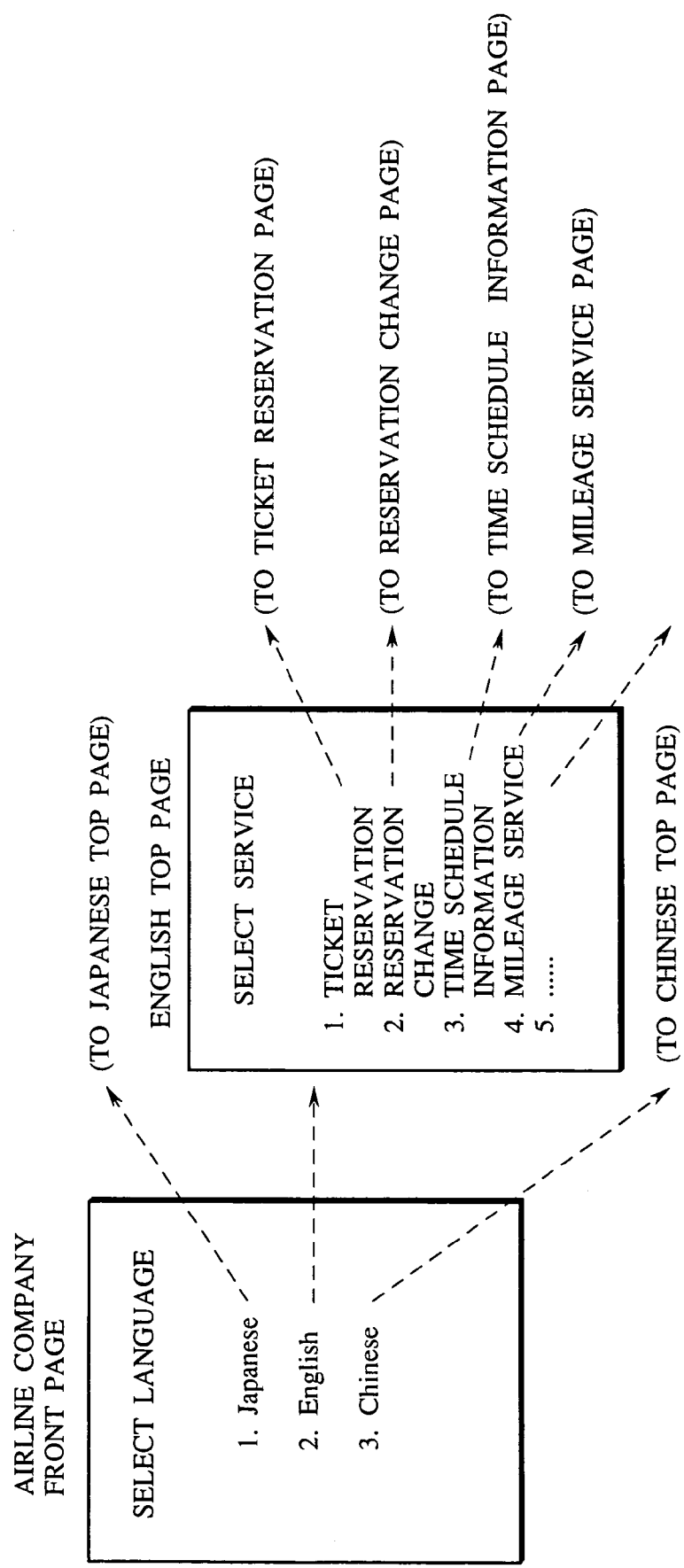
FIG. 3 is a diagram for explaining a configuration of a Web page that can be used in the information delivery system of FIG. 1.

FIG. 3 shows an exemplary configuration of a Web page, which is a Web page of an airline company designed to be used for the ticket reservation. In this Web page, the options regarding the language to be used in this service (which are links to respective top pages in Japanese, English and Chinese) are presented on the top page (airline company entry page) first so as to urge the user to select a desired language. If the user selects English, for example, a page linked to "English" option (English top page) will be displayed. In this page, the options regarding services (which are links to respective related pages) such as (1) ticket reservation, (2) reservation change, (3) time schedule information, (4) mileage service, etc., are presented so as to urge the user to select a desired service. When the user selects a desired service ((4) mileage service, for instance), the Web page linked to the selected service (the mileage service page, for instance) is displayed, and this service is provided on that Web page, or the user jumps from another page from there, and so on.

Note that one of the advantages of receiving the WWW based information delivery using a mobile terminal device is that the user who is the recipient of the information delivery can receive services while seamlessly moving in space. For example, as shown in FIG. 4, the user can receive the information delivery at a location A, and then move to a location B and receive the information delivery there.

In such a mobile environment, an information provider who has a store X in a vicinity of the location A may wish to provide the own WWW information (which is normally to be provided from the WWW server 2a) at higher speed than normal at least to a user who is located at the location A (a user of the mobile terminal device 1 which is connected to the wireless base station 12a), and similarly, an information provider who has a store Y in a vicinity of the location B may wish to provide the own WWW information at higher speed than normal at least to a user who is located at the location B.

Figure 4:
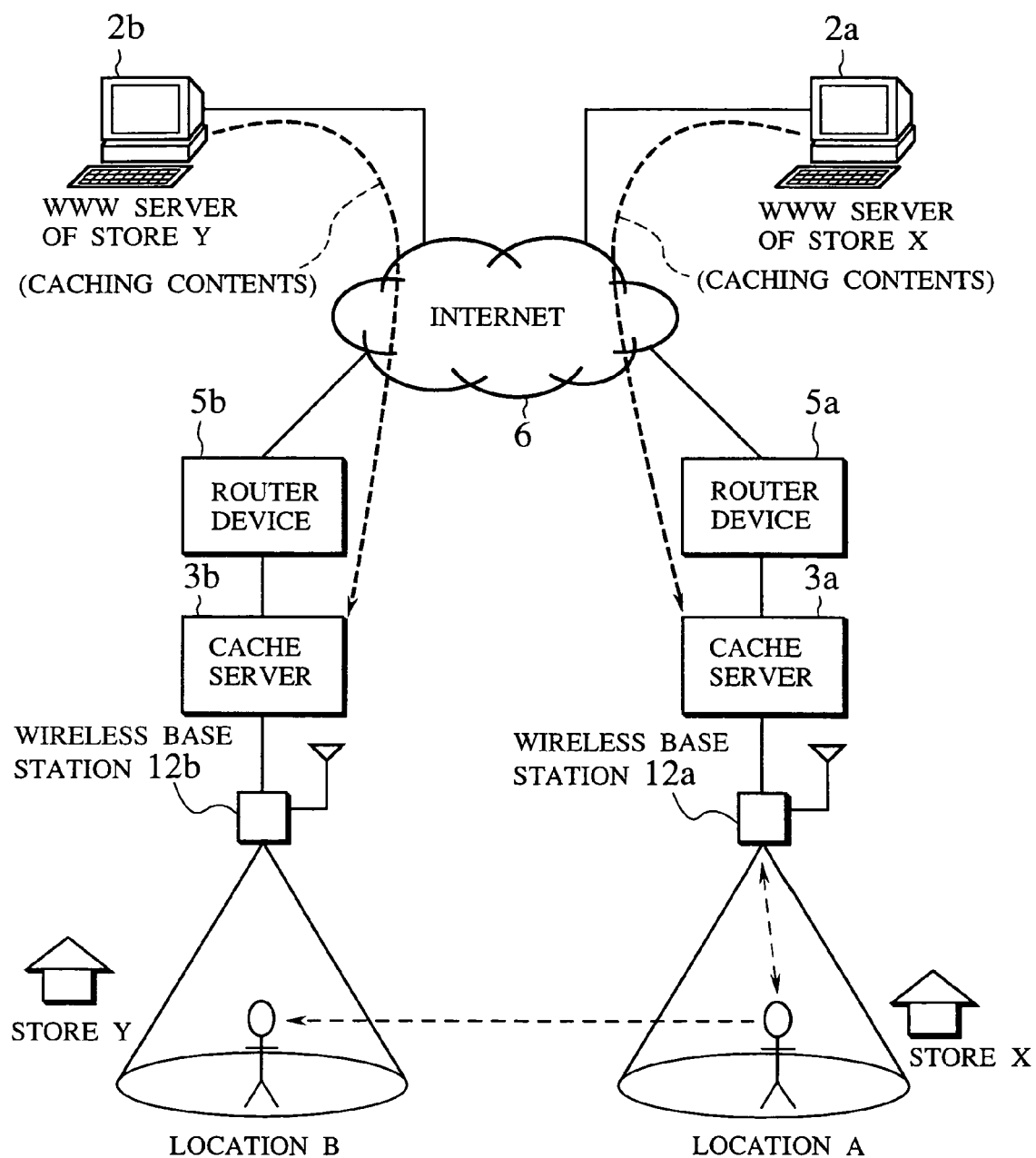
FIG. 4 is a diagram for explaining a service with respect to a user who accesses specific area dependent WWW pages that can be provided by the information delivery system of FIG. 1.

In order to meet such demands, as shown in FIG. 4, all or a part of the WWW information provided by the WWW server 2a for the store X is cached into the cache server 3a associated with the wireless base station 12a whose covering area contains the location of the store X or the cache server 3a associated with the wireless base station 12a whose covering area contains a location of a railway or bus station closest to the store X, for example. In this way, the mobile terminal device 1 that has moved to a vicinity of the store X or the railway or bus station closest to the store X and made a connection to the wireless base station 12a can acquire the WWW information regarding the store X in a very short time (provided that this information is cached in the cache server 3a), when the acquisition of this information is requested by the user. The caching of the WWW information regarding the store Y in the cache server 3b can be realized similarly.

This kind of demands can arise in various system scales. Exemplary situations in which this kind of demands can arise include the case where a store located in front of a railway or bus station wishes to deliver own information to users who are located in a vicinity of that railway or bus station, using the information providing service based on a public network (PHS network, for example), and the case where it is desired to provide the information of stores located in a particular area of a shopping mall to those users who have moved into that particular area at higher priority and higher speed than normal, using the information providing service based on a wireless LAN of the shopping mall.

In other words, in this example, it is possible to provide a service with respect to a specific information provider by which the information delivery can be realized at higher speed than normal in a specific spatial location.

On the other hand, in the case of using a wireless network with a narrow bandwidth, some users may wish to have a capability for accessing particular WWW pages at higher speed than normal even if it requires a payment of an extra fee. In order to meet such demands, it is possible to provide a high speed access service with respect to such users as follows.

Figure 5:
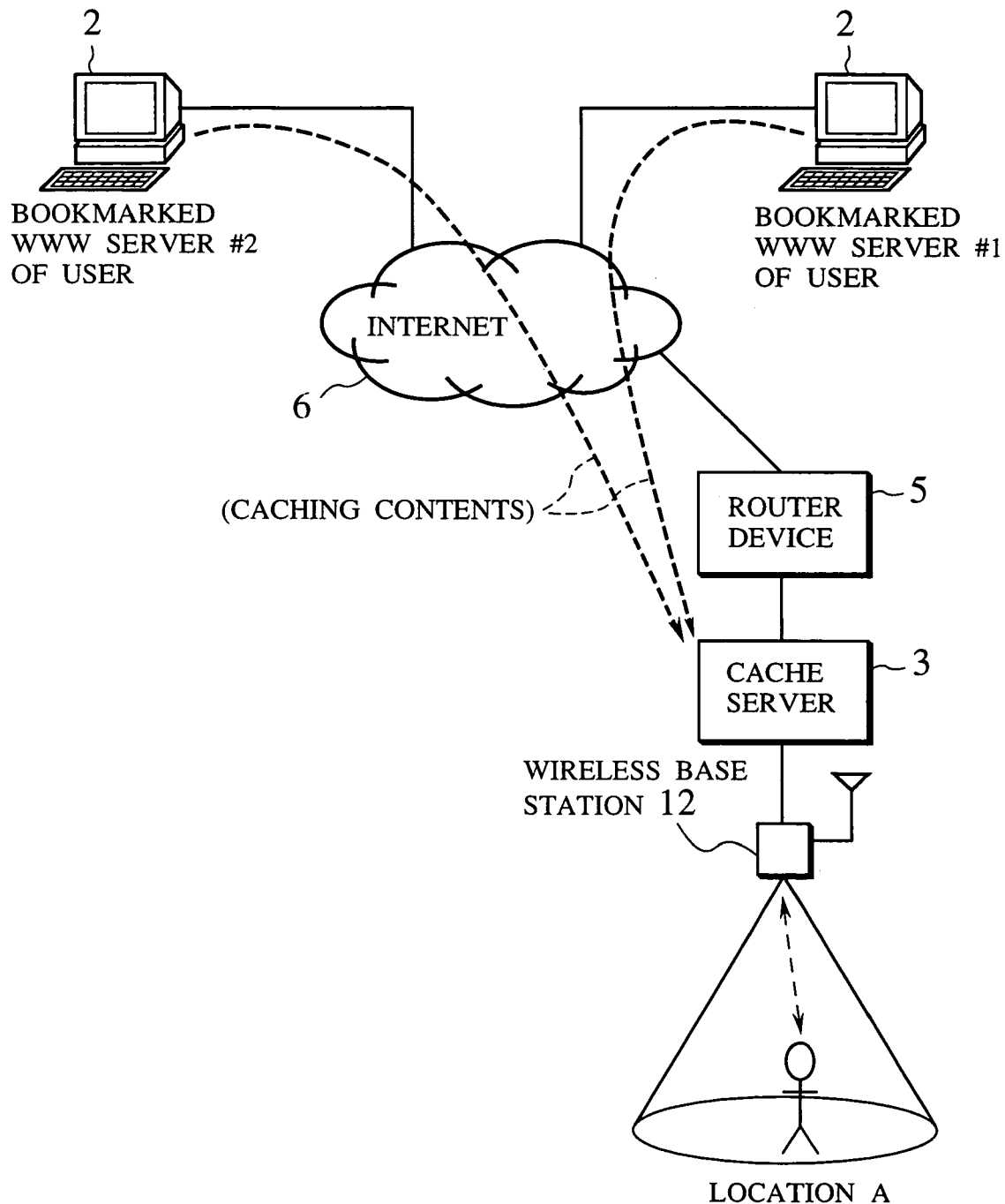
FIG. 5 is a diagram for explaining a service that makes accesses of a specific user faster that can be provided by the information delivery system of FIG. 1.

For example, suppose that a user makes a connection to the network at some location (location A) and starts to receive the information delivery service, as shown in FIG. 5. Here, it is possible to generate an information regarding which WWW page group is accessed by this user frequently by utilizing the past WWW access log information recorded in the browser used on that terminal or the preference information (bookmark information) registered in that WWW browser, for example. Consequently, when the user made the connection to the network at the location A, WWW pages having high possibilities of being accessed by this user are obtained from the above information and these WWW pages are cached into the cache server 3 nearest to the location A. In this way, it is possible to provide the higher than normal speed access at least with respect to these cached WWW pages.

In other words, in this example, it is possible to provide a service with respect to a specific information service user by which the higher than normal speed access can be realized for specific WWW pages.

Summarizing the above two examples, it can be said that the information delivery scheme of the present invention defines classes among (1) information providers (advertisement sponsors, for example) or (2) information service users, and provides a special WWW page caching service with respect to information providers belonging to a particular class (referred hereafter as premier sponsors) or information service users belonging to a particular class (referred hereafter as premier users). Here, the definition of classes for the information providers (referred hereafter as sponsors) or the information service users (referred hereafter as users) such as how many classes should be defined and the caching policy to be used in each individual class for which the caching service is to be provided (referred hereafter as premier class) can be decided by the system manager side in view of various factors such as a scale of the system, the number of cache servers, the amount of resource available in the cache server, the number of users, the overall amount of traffics, etc.

It should be obvious that it is possible to provide the WWW page caching service with respect to the premier sponsors alone or the WWW page caching service with respect to the premier users alone, but it is also possible to provide both of these services together. The following description will be directed to the case of providing both of these services.

Figure 6:
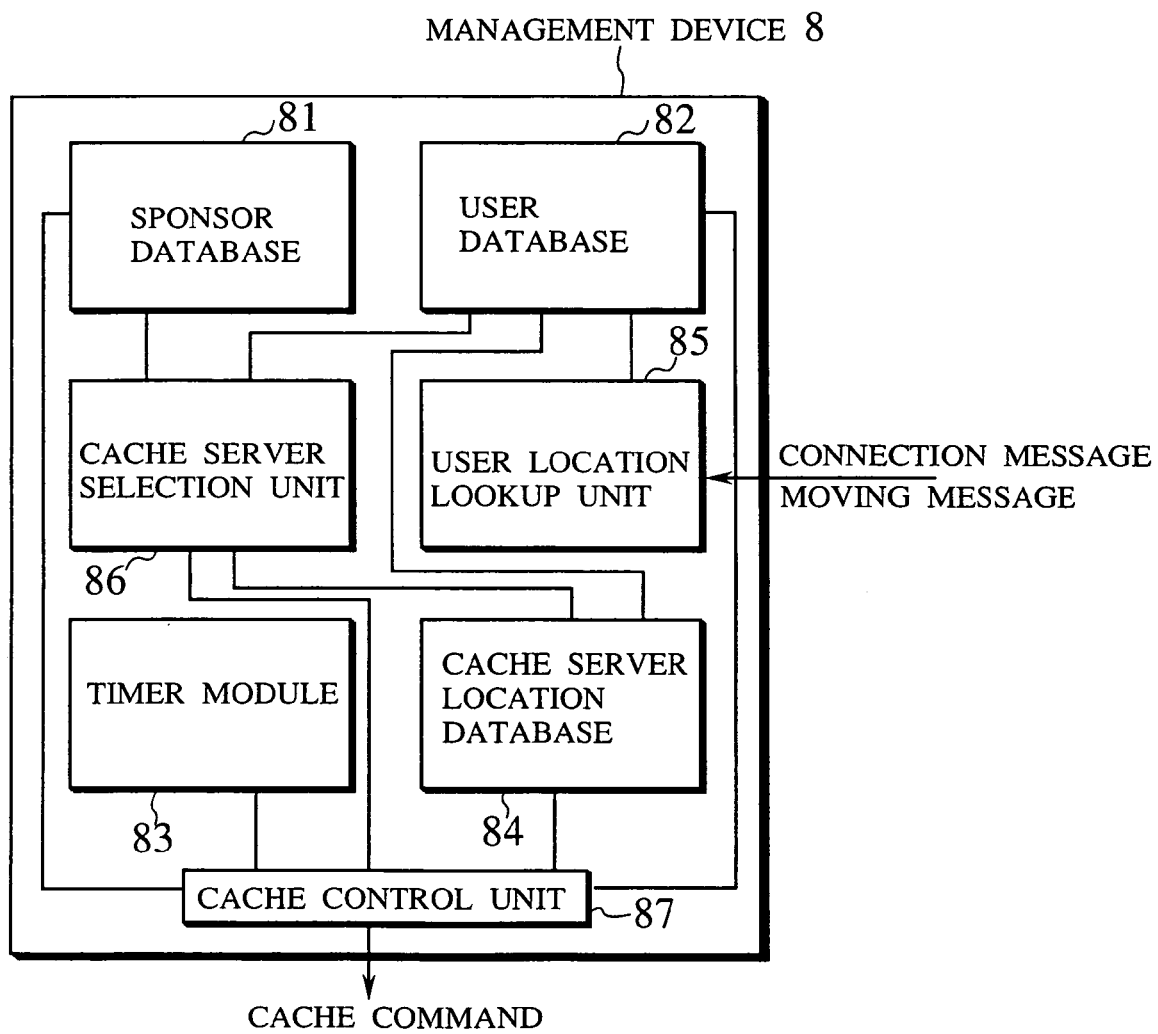
FIG. 6 is a block diagram showing an exemplary configuration of a management device in the information delivery system of FIG. 1.

FIG. 6 shows an exemplary configuration of the management device 8 for providing the above described services.

As shown in FIG. 6, the management device 8 has a sponsor database 81 for maintaining and managing information regarding the premier sponsors, a user database 82 for maintaining and managing information regarding the premier users, and a cache server location database 84 to be described in detail below. Note that, as described in further detail below, the management device 8 may also have a timer module 83 in some cases.

In addition, the management device 8 has a user location lookup unit 85 for receiving a connection message or a moving message from the mobile computer and registering a current connected location information of the mobile computer in the user database 82, a cache server selection unit 86 for selecting one or more cache servers appropriate for each premier sponsor or each premier user according to the sponsor database 81 or the user-database 82 and the cache server location database 84, and a cache control unit 87 for controlling the cache servers selected by the cache server selection unit 86 to cache appropriate WWW information for each premier sponsor or each premier user.

FIG. 7A shows an exemplary format of the sponsor database 81 for the premier sponsors, which has four fields including "sponsor ID", "caching range", "cache data amount" and "cache update frequency".

The sponsor ID is an identifier of each premier sponsor. For this sponsor ID, a URL (Uniform Resource Locator) of the WWW top page of each premier sponsor can be used, for example.

The cache data mount is an information indicating a range of WWW pages of the premier sponsor that are to be cached. For example, it is possible to provide several choices such as (1) a top page alone, (2) all pages up to the second hierarchical link relation (the top page and pages directly linked from the top page, (3) up to 10 pages at most, and (4) all contents, and appropriate choice is selected according to the class (or the premier level) of each sponsor. The cache data amount field registers a list of identifiers of the WWW pages to be cached, for example.

The caching range is an information indicating a geographical range of the cache servers into which the WWW pages specified by the cache data amount field are to be cached. This information is indicated by a list of the cache server IDs, for example.

The cache update frequency indicates an interval for updating the cached WWW page data. For this cache update frequency, an appropriate value can be set according to the class (or the premier level) of each sponsor.

Note that it is also possible to enable finer settings such as a setting of the cache data amount for each cache server separately, or a setting of the cache update frequency for each WWW page separately.

Note also that, although omitted in FIG. 7A, it is also possible to provide a field for "class" of each sponsor. This field can be provided as an additional field in FIG. 7A or in another database for recording correspondences between the sponsor IDs and the classes.

The sponsor database 81 is updated by the system manager in order to account for an admission of a new premier sponsor, a withdrawal of an admitted premier sponsor, or a change of the premier class of an admitted premier sponsor.

Note that the management device 8 may have the timer module 83 in order to inspect the cache data update frequency with respect to each premier sponsor. The timer processing for the update frequency can be realized either by a centralized management at the management device 8 or by a distributed management at each cache server 3. In the case of adopting the latter method, the timer module 83 can be omitted from the management device 8.

FIG. 7B shows an exemplary content of the sponsor database 81 for the premier sponsors. Here, the following four classes are defined for the premier sponsors.

Class A: Caching 10 pages at most in every 6 hours, into three cache servers at most.

Class B: Caching 5 pages at most in every 24 hours, into three cache servers at most.

Class C: Caching 5 pages at most in every 24 hours, into one cache server.

Class D: Caching only one page in every 72 hours, into one cache server.

FIG. 7B shows the content of the sponsor database 81 for four sponsors (with their sponsor IDs given by URL1 to URL4) who have chosen these four classes A, B, C and D respectively.

FIG. 8 shows an exemplary format of the user database 82 for the premier users, which has four fields including "user ID", "caching order", "connected cell ID", and "nearby cache server ID".

The user ID is an identifier of each premier user.

The caching order indicates the hierarchical order from the top up to which the WWW information contained in the bookmark information notified from the mobile terminal device 1 of the premier user should be cached, in their (determined) priority order. Here, the bookmark information can be an information indicating the priority order itself, the past access frequencies, the access possibilities derived from the past access frequencies, the order of appearance in a list when the WWW pages are sorted in the descending order of their priority orders. For example, the caching order can be set according to the premier user classes as follows.

Class A: Caching up to the top 10th data.

Class B: Caching up to the top 5th data.

Class C: Caching up to the top 3rd data.

The connected cell ID is an identifier of a cell corresponding to the wireless base station 12 to which the mobile terminal device 1 of the premier user is currently connected, which is notified from the mobile terminal device 1 of the premier user.

The nearby cache server ID is an identifier of the cache server 3 corresponding to the wireless base station 12 to which the mobile terminal device 1 of the premier user is currently connected. The nearby cache server ID can be obtained by searching through the cache server location database 84 according to the connected cell ID.

Note that, although omitted in FIG. 8, it is also possible to provide a field for "class" of each user. This field can be provided as an additional field in FIG. 8 or in another database for recording correspondences between the user IDs and the classes.

The user database 82 is updated by the system manager in order to account for an admission of a new premier user, a withdrawal of an admitted premier user, or a change of the premier class of an admitted premier user, similarly as the sponsor database 81. In addition, the user database 82 can be changed dynamically according to the cell (wireless base station 12) connection state of the mobile terminal device 1.

Figure 9:
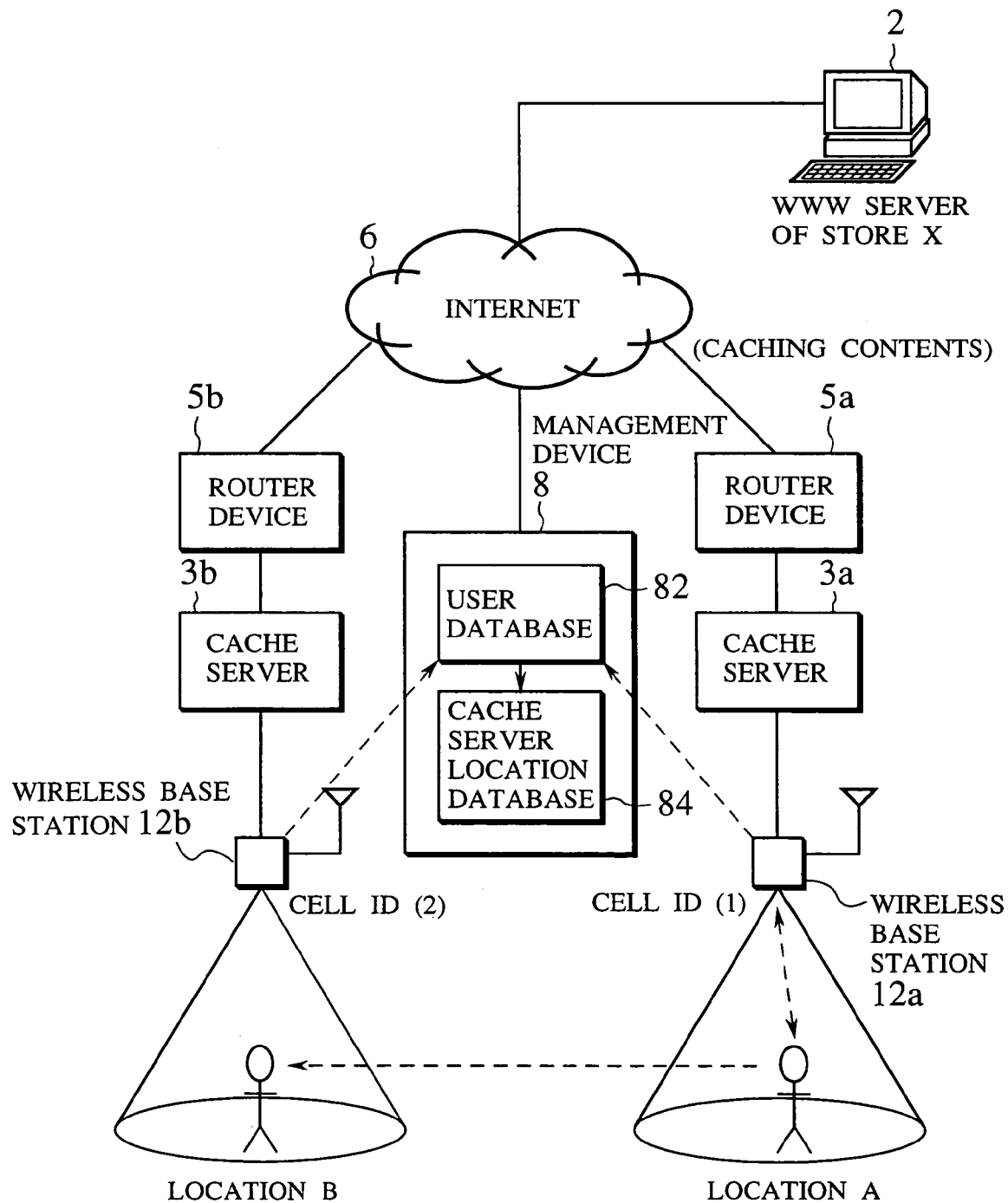
FIG. 9 is a diagram for explaining a processing that takes place in conjunction with a premier user location change in the information delivery system of FIG. 1.

Referring now to FIG. 9, a flow of the processing of the management device 8 that takes place in conjunction with a location change of the premier user (that is the mobile terminal device 1) will be described.

First, when the mobile terminal device 1 of the premier user is connected to the wireless base station 12a, a connection message containing a user ID, a connected cell ID and the Bookmark information are notified from the mobile terminal device 1 to the management device 8. Here, the mobile terminal device 1 can ascertain the connected cell ID from data transmitted by the wireless base station 12a.

Upon receiving this connection message, the management device 8 registers the received connected cell ID into a connected cell ID field of an entry corresponding to the received user ID among the entries of the user database 82.

Also, the management device 8 is maintaining the cache server location database 84 that registers correspondences between the connected cell IDs and the cache server IDs, and searches through the cache server location database 84 using the received connected cell ID as a key in order to obtain the ID of the cache server that is currently located closest to the premier user, and registers the cache server ID so obtained into the nearby cache server ID field of the above entry of the user database 82.

Here, the cache server location database 84 may also register attribute information of each cache server such as a memory capacity, a caching policy of each cache server, etc.

Thereafter, whenever the connected cell of the premier user is changed during communications, a moving message containing the user ID and a new connected cell ID is notified from the mobile terminal device 1 to the management device 8, and the management device 8 searches out the closest cache server of the premier user again and updates the connected cell ID field and the nearby cache server ID field of the corresponding entry in the user database 82. Namely, the currently closest cache server of each premier user is always registered in the user database 82 of the management device 8.

The management device 8 also issues a command indicating which WWW pages should be cached, with respect to the corresponding cache server in the system according to the sponsor database 81 and the user database 82.

Namely, for each premier sponsor, the management device 8 issues a cache command indicating that data of one or a plurality of WWW pages determined according to the content of the cache data amount field should be cached, with respect to one or a plurality of cache servers specified by the caching range field, according to the sponsor database 81. Also, the management device 8 commands these cache servers to carry out the data updating at a frequency specified by the cache update frequency field, as described above.

In the case of the centralized management of the timer processing for the update frequency at the management device 8, a time at which the immediately previous cache command was issued is maintained as an immediately previous update time for each premier sponsor, and whether a next update time is reached or not is regularly checked according to the immediately previous update time, an update interval, and a current time, for example. Then, for the premier sponsor for which the next update time is reached, the similar cache command is issued again. Here, instead of issuing the similar cache command again, it is also possible to maintain the correspondence between the cached WWW pages and the sponsor ID in the cache server 3, and notify the sponsor ID corresponding to the cache data to be updated from the management device 8 to the cache server 3.

Also, for each premier user, at a time of new network connection, the management device issues a cache command indicating that data of a prescribed number of WWW pages determined from the content of the caching order and the list of WWW pages contained in the Bookmark information received from the mobile terminal device 1 of the premier user should be cached, with respect to the cache server indicated by the nearby cache server ID, according to the user database 82. At a time of moving between cells, the management device 8 either issues the similar cache command to a new cache server (in which case the sponsor database 81 should also have a field for registering a list of IDs of the WWW pages to be cached that are determined from the list of WWW pages contained in the Bookmark information received from the user side at a time of the network connection and the content of the caching order), or issues a command for moving or copying the corresponding WWW information from the original closest cache server to a new closest cache server, with respect to the original closest cache server (or the new closest cache server).

Note that a method for specifying cache data to be moved or copied with respect to the cache server 3 at a time of moving between cells can be either that in which the list of the WWW pages to be moved or copied is notified from the management device 8 to the cache server 3, or that in which the correspondence between the cached WWW pages and the user ID is maintained in the cache server 3 and the user ID corresponding to the cache data to be moved or copied is notified from the management device 8 to the cache server 3.

Figure 10:
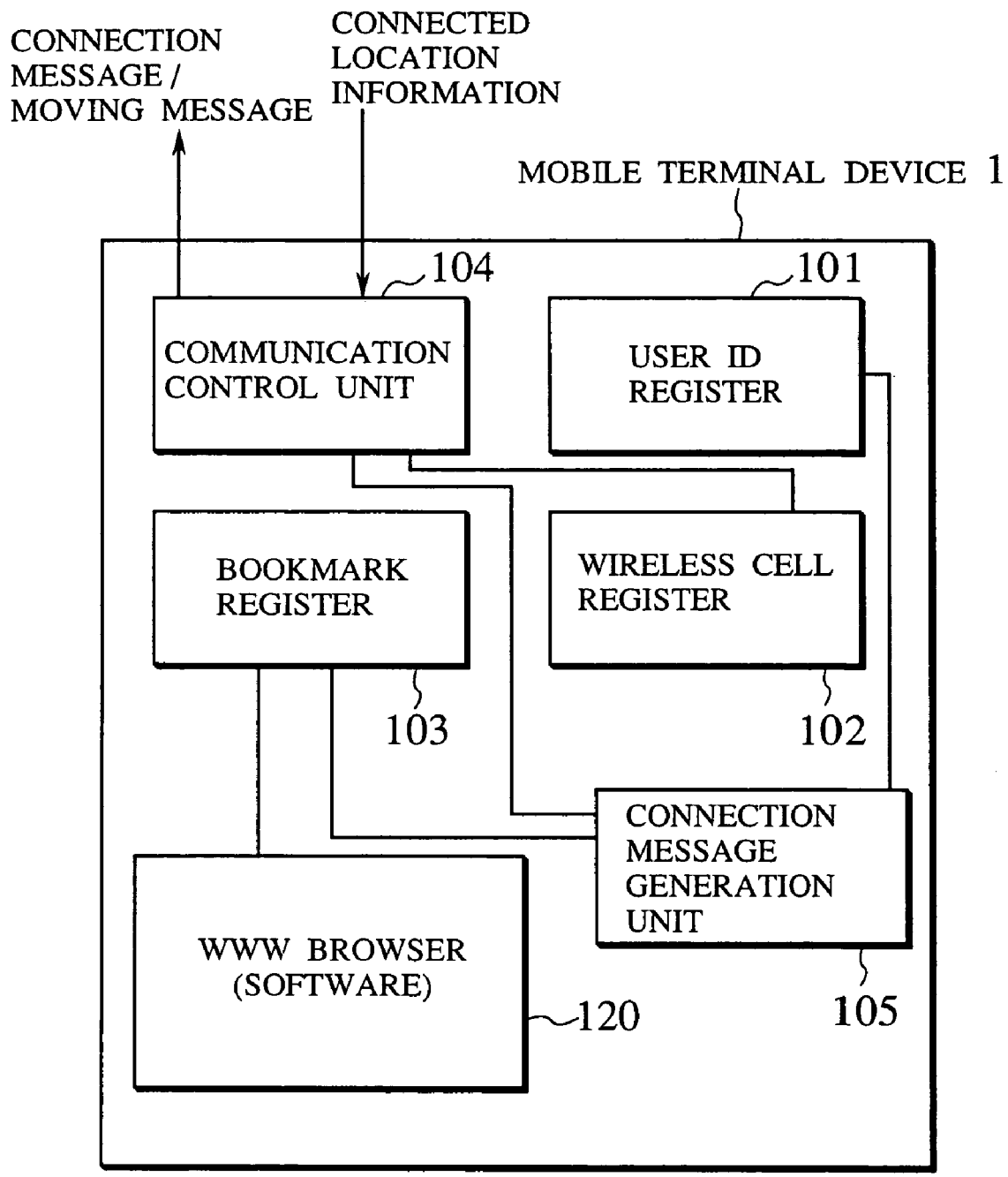
FIG. 10 is a block diagram showing an exemplary configuration of a mobile terminal device in the information delivery system of FIG. 1.

FIG. 10 shows an exemplary configuration of the mobile terminal device 1 in this embodiment. Here the description of ordinary modules related to the Web access will be omitted, and only modules related to the cache processing will be described.

As shown in FIG. 10, the mobile terminal device 1 has a user ID register 101 for registering the user ID, a wireless cell register 102 for registering the connected cell ID, a Bookmark register 103 for maintaining a copy of the Bookmark information of a WWW browser 120, a communication control unit 104 for carrying out communications with the management device 8 and the wireless base station 12, and a connection message generation unit 105 for generating a connection message from the user ID registered in the user ID register 101, the connected cell ID registered in the wireless cell register 102 and the Bookmark information registered in the Bookmark register 103, and transferring the generated connection message to the management device 8 through the communication control unit 104.

Figure 11:
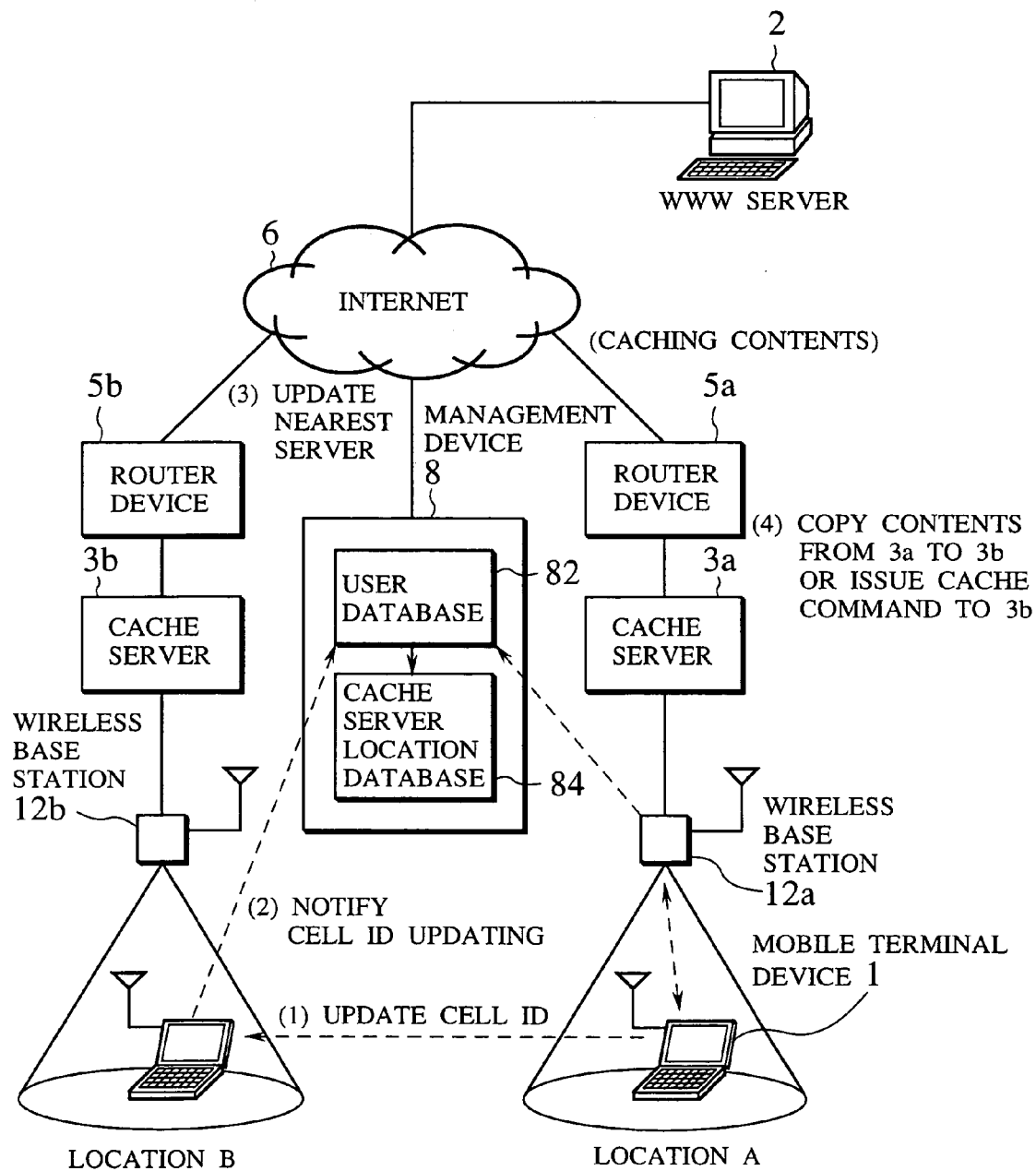
FIG. 11 is a diagram for explaining an operation at a time of moving of a mobile terminal device in the information delivery system of FIG. 1.

For example, when the network connection is established initially at a location A shown in FIG. 11, the mobile terminal device 1 transfers a connection message to the management device 8 according to the contents of the user ID-register 101, the wireless cell register 102 and the Bookmark register 103.

As described above, the management device 8 that received this connection message then carries out the processing for the premier class of the user according to the user ID. As a result, the corresponding WWW information is cached into the cache server 3a in the example shown in FIG. 11.

Here, the mobile terminal device 1 regularly updates the content of the wireless cell register 102 in order to deal with the moving of the premier user during communications. Then, when the connected cell ID is updated as the user has moved from a location A to a location B, for example, the mobile terminal device 1 transfers a moving message to the management device 8 according to the contents of the user ID register 101 and the wireless cell register 102 at this timing.

As described above, the management device 8 that received this moving message then searches out the closest cache server again and either issues the cache command to the closest cache server after the moving (the cache server 3b in the example shown in FIG. 11) or transfers a message indicating the moving with respect to the cache server that was closest immediately previously (the cache server 3a in the example shown in FIG. 11) In the latter case, the above message may be used in realizing a control such that the content of the cache server that was closest immediately previously is invalidated, or the content of the immediately previously closest cache server is inherited (by moving or copying the corresponding content of the cache server 3a to the cache server 3b, for example) if the content is the latest one.

Note that, in the above, the Bookmark information is notified to the management device 8 by containing it in the connection message at a time of the network connection, but it is also possible to notify the Bookmark information to the management device 8 by containing it in the moving message when the Bookmark information is updated in the mobile terminal device 1 such that the management device 8 obtain the WWW pages to be cached for that mobile terminal device 1 again when the Bookmark information is contained in the moving message.

Also, in the above, a copy of the Bookmark information of the WWW browser is maintained in the Bookmark register 103, but as already mentioned above, the Bookmark register 103 may store a prescribed number of page groups with higher counts obtained from the past WWW access log information recorded in the WWW browser, or a prescribed number of page groups determined comprehensively according to the WWW access log information and the Bookmark information of the WWW browser.

Figure 12:
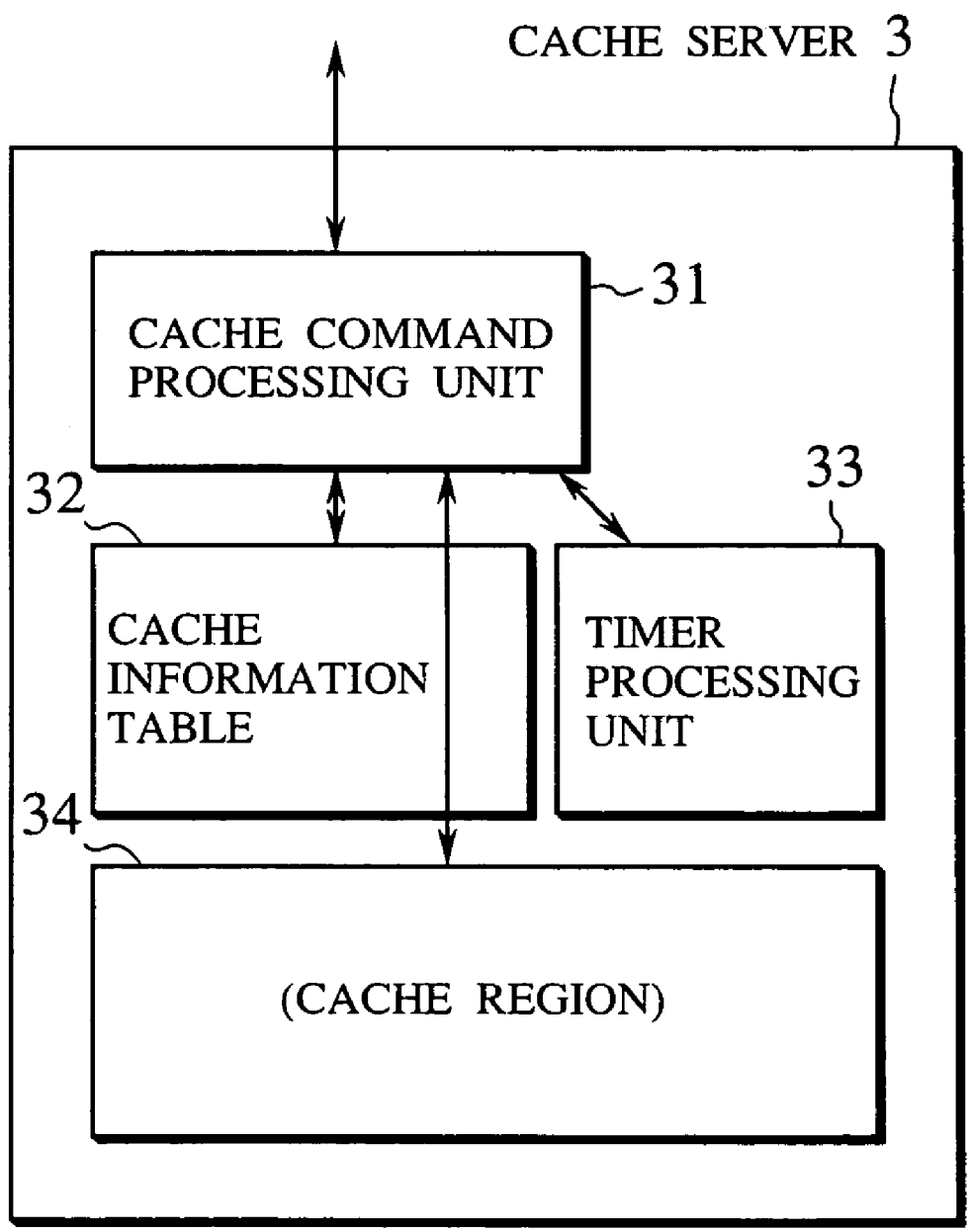
FIG. 12 is a block diagram showing an exemplary configuration of a cache server in the information delivery system of FIG. 1.

FIG. 12 shows an exemplary configuration of the cache server 3 according to this embodiment.

Upon receiving the cache command from the management device 8, the cache server 3 checks the WWW pages to be cached by interpreting the cache command at a cache command processing unit 31, and fetches the corresponding WWW page data and caches them into a cache region 34.

For the sake of management, the cached WWW page data should preferably be maintained separately for each premier sponsor or premier user ID that caused the caching. In addition, the cached WWW page data may also maintained separately for each premier sponsor or premier user class. Also, in the case of maintaining the identical WWW page data for a plurality of different premier users, for example, as many of the identical WWW page data as the number of these plurality of users may be maintained, or only one such WWW page data may be actually stored in correspondence to the IDs of these plurality of premier users.

Note that, in the case of carrying out the cache update processing for the premier sponsors at the cache server side, a cache information table 32 for maintaining an ID of each owner (premier sponsor) of each cached content, an immediately previous update time, and an update interval, and a timer processing unit 33 for inspecting the update frequency are provided in the cache server 3 such that the ID of the owner (premier sponsor) of the cached content for which the next update time is reached is extracted and the processing to update the content of the corresponding WWW page is carried out, according to the immediately previous update time, the update interval, and the current time, regularly at the timer processing unit 33.

Note that, in the cache region 34 of the cache server 3, a prescribed amount (a whole or a part) may be allocated at higher priority or reserved in advance to the premier sponsors or the premier users.

In the following, the several exemplary operations for realizing the caching policy with respect to the premier sponsors or the premier users in the system having the basic configuration as described above will be described.

(Exemplary Operation 1: Premier Sponsors)

Figure 13:
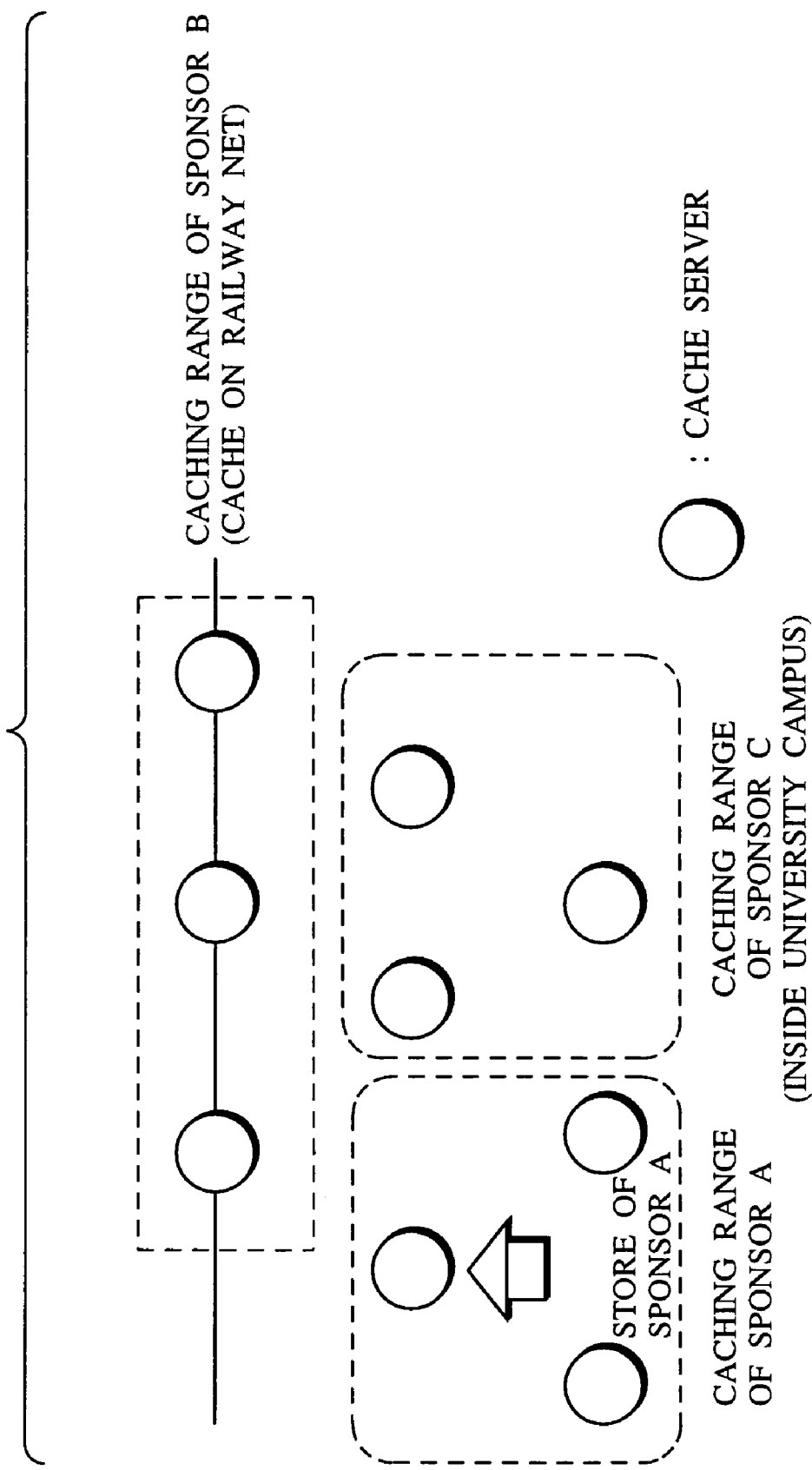
FIG. 13 is a diagram for explaining one exemplary operation for a caching service with respect to premier sponsors that can be realized by the information delivery system of FIG. 1.

FIG. 13 shows an exemplary situation realized by controlling the management device 8 and the cache servers 3 with respect to the premier sponsors. Here, each of a plurality of sponsors A, B and C can cache at most 5 MB of the own home pages into three cached servers at prescribed locations. Each premier sponsor considers cache server locations (that is the wireless base station locations or their covered areas) to which the own customers are likely to come, and determines the cache servers by accounting for the factors such as a closest train or bus station should be included. There can be special cases that require special selection of the cache server locations, such as those within a local network of the railway or within a campus network of the university. Of course, there can be some cache server that many sponsors wish to use, and in such a case, the memory capacity of such a cache server may be increased, or the fee for using that cache server may be raised such that the sponsors will be distributed to the nearby cache servers that require lower fees.

In this case, information oh the selected cache servers, the WWW page contents to be cached, and the cache update frequency is entered into the sponsor database 81 of the management device 8. According to the entered information, the management device 8 issues the cache command to each cache server 3.

(Exemplary Operation 2: Classification of Premier Sponsors)

As already mentioned above, for the premier sponsors, it is possible to set up a plurality of classes according to factors such as the number of cache servers that can be used, the amount of contents that can be cached, and the contents update frequency. In FIG. 7B, the following four classes for the premier sponsors are set up.

Class A: Caching 10 pages at most in every 6 hours, into three cache servers at most.

Class B: Caching 5 pages at most in every 24 hours, into three cache servers at most.

Class C: Caching 5 pages at most in every 24 hours, into one cache server.

Class D: Caching only one page in every 72 hours, into one cache server.

Such a premier class classification can be set up arbitrarily by the system operator, and in particular, the conditions or the premier fee setting may be changed according to the number of users or the number of sponsors.

(Exemplary Operation 3: Case Involving Many Premier Sponsors)

When many premier sponsors demanded caching into the same cache server (and when the available memory capacity of that cache server becomes lower than a prescribed criterion as a result), it is possible to adopt any of the following measures.

- Increase the memory capacity of the cache server to which the demands are concentrated.
- Reduce the cache size of the lower class premier sponsors.
- Move the cache data of the lower class premier sponsors to a nearby substitute cache server (a case server associated with the wireless base station, for example).
- Use hierarchical cache servers, and move the cache data of the lower class premier sponsors to the higher level cache server.

It is also possible to set up the priority orders among data to be cached according to the dynamic access logs regarding that cache server.

Figure 14:
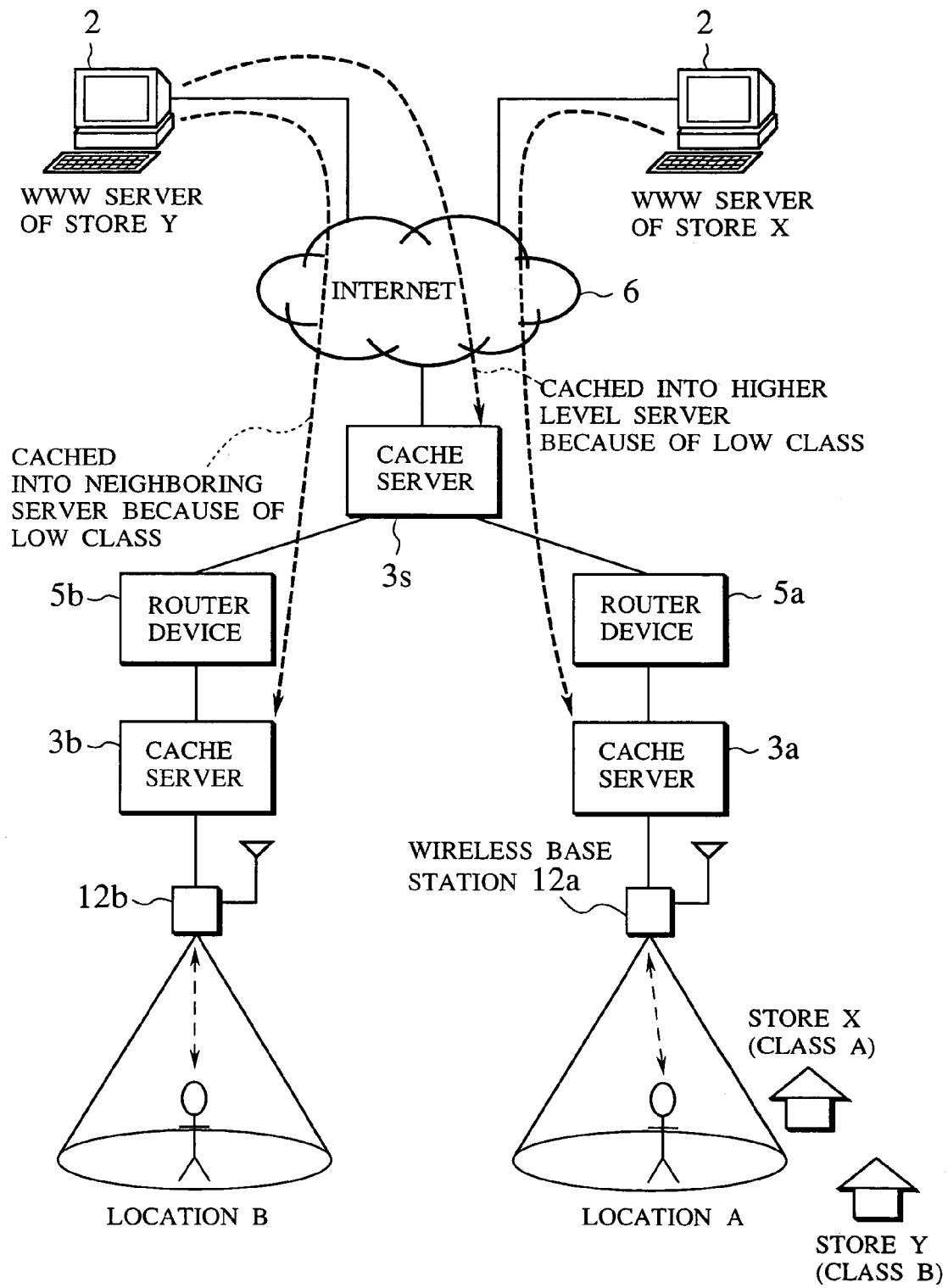
FIG. 14 is a diagram for explaining another exemplary operation for a caching service with respect to premier sponsors that can be realized by the information delivery system of FIG. 1.

FIG. 14 shows the case where the cache data of the lower class premier sponsors are moved to the substitute cache server or the higher level cache server.

Note that the above described control is to be realized by the management device 8 for example.

Besides these, it is also possible to adopt a measure to raise the fee for using that cache server such that the users will be distributed.

(Exemplary Operation 4: General Case of Premier Users)

Figure 15:
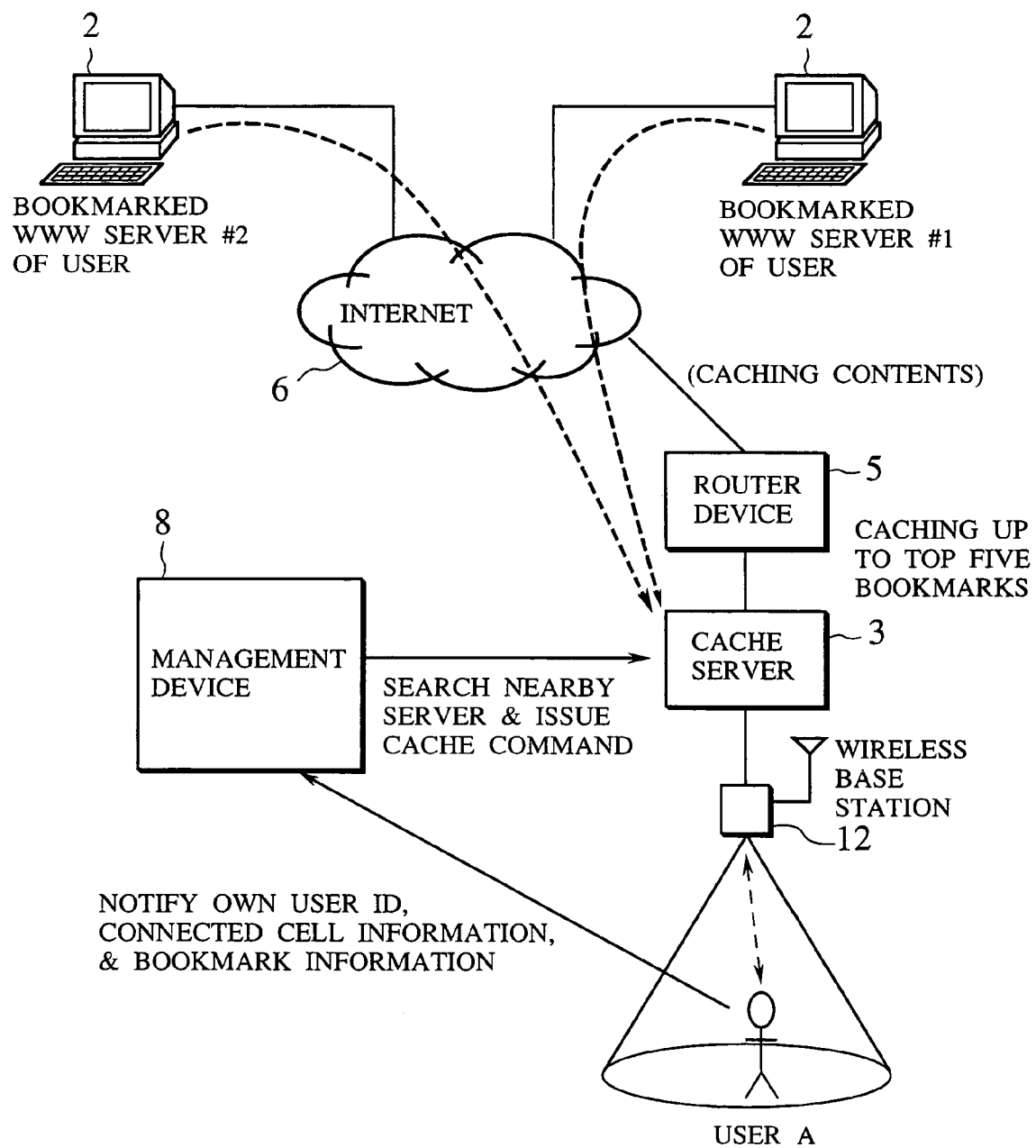
FIG. 15 is a diagram for explaining one exemplary operation for a caching service with respect to premier users that can be realized by the information delivery system of FIG. 1.

FIG. 15 shows an exemplary situation realized by controlling the management device 8 and the cache servers 3 with respect to the premier users. Here, the case in which a plurality of users are connected to the network will be described.

Suppose that the user A has the premier contract for caching WWW pages up to the top five Bookmarked ones into the closest cache server.

When connected to the network, the user A notifies the own connected cell ID, the own user ID and the own Bookmark information to the management device 8. Upon receiving this, the management device 8 searches out the closest cache server 3 of the user A and commands this cache server to cache the WWW information of the user A by giving URL information of the top five Bookmarked ones.

(Exemplary Operation 5: Classification of Premier Users)

The premier users can also be classified into a plurality of classes.

As a criterion for the classification, it is possible to set up the following three classes depending on a part of the WWW pages contained in the Bookmark information of the premier user that is to be cached, for example.

- Class A: Caching up to the top 10th data.
- Class B: Caching up to the top 5th data.
- Class C: Caching up to the top 3rd data.

Besides that, it is also possible to set up the premier user classes depending on the control to be done such as the following.

- Whether or not a higher priority is to be given in the case of the overflow of the cache region of the cache server.
- Whether or not caching into surrounding cache servers in addition to the closest cache server is to be made in anticipation of the moving.

FIG. 16 shows the case where caching into the closest cache server alone is made for the normal premier user but caching into neighborhood surrounding cache servers in addition to the closest cache server is made for the privileged premier user. Note that in this case, the management device 8 maintains information regarding neighborhood relationship among the cache servers and obtains the neighborhood surrounding cache servers from the closest cache server of the user according to this information, for example.

(Exemplary Operation 6: Case Involving Many Premier Users)

When many premier users are concentrated in a vicinity of the same cache server (and when the available memory capacity of that cache server becomes lower than a prescribed criterion as a result), it is possible to adopt any of the following measures.

- Increase the memory capacity of the cache server to which the premier users are concentrated.
- Cache those data that are common among the Bookmark information of the premier users at a higher priority.
- Reduce the caching order of the lower class premier users, or give up caching for these users.
- Move the cache data of the lower class premier users to a nearby substitute cache server.
- Use hierarchical cache servers, and move the cache data of the lower class premier users to the higher level cache server.

It is also possible to set up the priority orders among data to be cached according to the dynamic access logs regarding that cache server.

Figure 17:
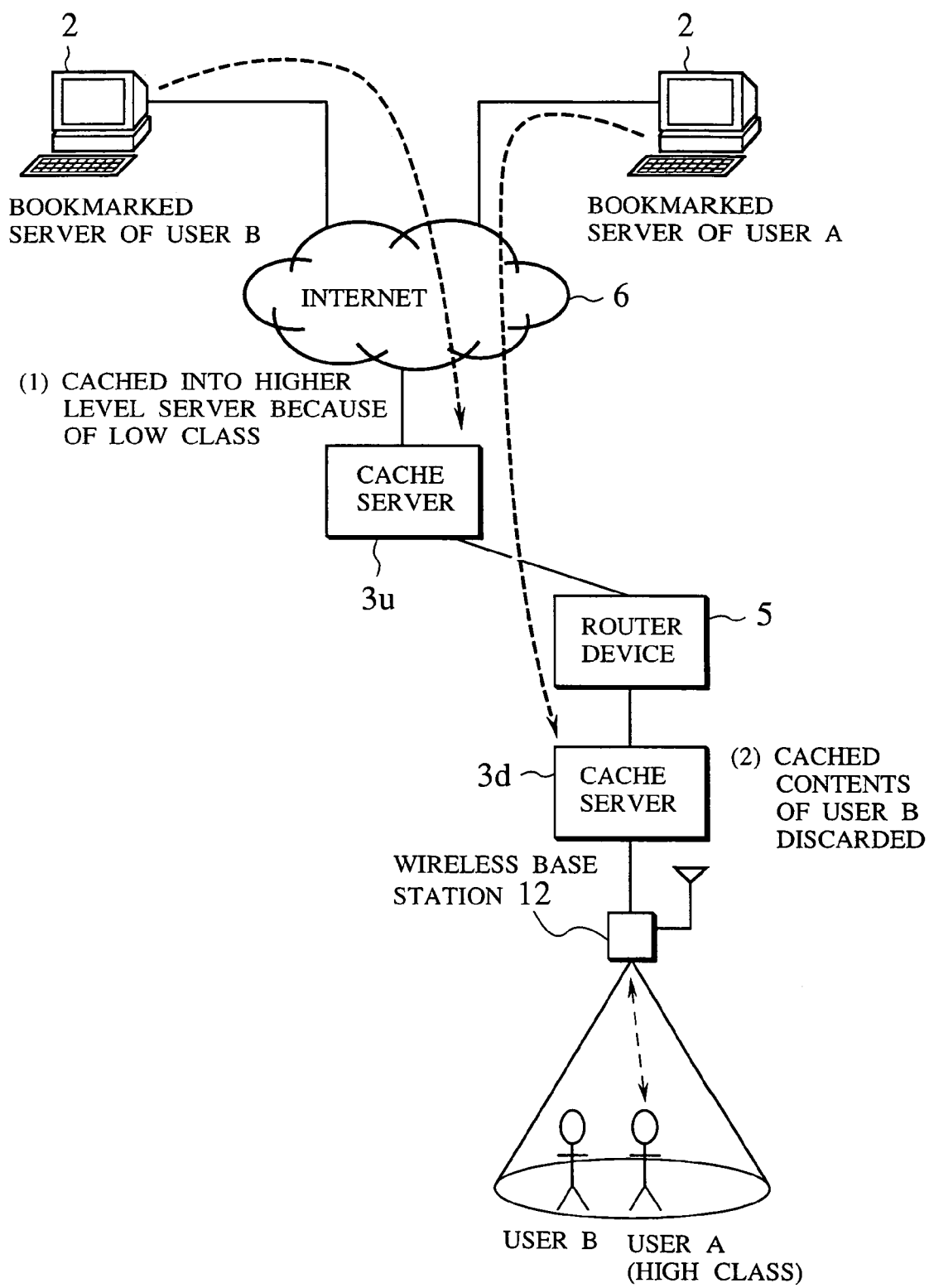
FIG. 17 is a diagram for explaining still another exemplary operation for a caching service with respect to premier users that can be realized by the information delivery system of FIG. 1.

FIG. 17 shows the case where the cache data of the lower class premier users are moved to the higher level cache server.

Note that the above described control is to be realized by the management device 8 for example.

Besides these, it is also possible to adopt a measure to raise the fee for using that cache server such that the users will be distributed.

Note that there can also be cases where many premier sponsors demand caching into the same cache server as described above and at the same time many premier users are concentrated in a vicinity of this same cache server as described here. In such a case, the measures explained in the exemplary operation 3 and the exemplary operation 6 can be used in appropriate combination. Also, in such a case, it is possible to adjust a relationship between the premier users and the premier sponsors such that the premier sponsors are given a higher priority than the premier users, for example.

In the following, several further variation of the above described embodiment will be described.

First, the preference of the premier user may be indicated by registering the specific page group at a time of the premier contract in advance, rather than using the Bookmark information of the Web browser as described above.

For example, it is possible to realize the control such that the head line news of the newspaper "a" and the stock information of the company "b" are cached at a higher priority for the user A, while the sales information of the company "c" and the information of the sports newspaper "d" are cached at a higher priority for the user B. Such an information can be incorporated as a part of the user database 82 of the management device 8.

FIG. 18 shows an exemplary format of the user database 82 of the management device 8 in this case, where a high priority page field is provided in the user database 82. The page groups requested by the users are registered in this field, and the management device 8 commands the corresponding cache server 3 to cache the page groups registered in the high priority page field, and up to the top (y-x)-th page group of the received Bookmark information if the number of pages x of the high priority pages is less than the number of pages y specified by the caching order. Else, it is also possible to command the corresponding cache server 3 to cache the page groups determined from the received Bookmark information and the caching order and the page groups registered as the high priority pages.

Note that a more flexible operation becomes possible by allowing the premier user to update the high priority pages using a management tool whenever necessary.

It is also adopt a configuration in which only the specific page groups registered at a time of the premier contract in advance are cached.

It is also possible to determine whether the method based on the Bookmark information alone should be used, or the method based on the registration alone should be used, or both of them should be used, depending on the classes.

Next, an exemplary case of combining the configuration regarding the service with respect to the premier sponsors and the configuration regarding the service with respect to the premier users will be described.

As a possible form of the data delivery in this case, the data delivery with respect to a specific user group specified by the premier sponsor (which may contain users of a non-premier user class when such a class is set up) can be realized such that data that the premier sponsor wish to delivery are delivered to the closest cache server to which a user of this specific user group is connected. This is effective, for example, when a department store wishes to provide the advertisement information on the preferred commercial field of a specific customer, with respect to that specific customer at a higher than normal speed. In this way, the user specified by some premier sponsor can access information specified by that premier sponsor at higher than normal speed.

FIG. 19 shows an exemplary format of the user database 82 of the management device 8 in this case, where a related sponsor information field is provided in the user database 82, for example, one or a plurality of IDs of the sponsors who specify this user are registered in this field for each user. Then, the management device 8 checks the sponsors who are specifying this user from the related sponsor information during the processing at a time of receiving the connection message from the mobile terminal device 1, obtains the WWW pages specified in the "cache data amount" of each sponsor by referring to the user database 82, and commands the corresponding cache server 3 to cache the obtained pages as well for this user.

Note that in this case, it is also possible to provide a push data field in the sponsor database 81 as shown in FIG. 20, and register the IDs of the WWW pages that the sponsor wishes to send to the closest cache server of the specified user. Also, the sponsor may be allowed to specify the WWW pages to be sent for each specified user separately.

Also, instead of changing the sponsor database 81, it is possible to use the related sponsor information field (FIG. 19) provided in the user database 82 to collectively register for each user an information on the WWW pages that one or a plurality of sponsors specifying this user are wishing to cache for this user, rather than the sponsor IDs.

Also, it is possible to provide a specified user ID field in the sponsor database 81 as shown in FIG. 21, and register IDs of the users specified by each sponsor in this field. The management device 8 checks whether there exists any sponsor who is specifying the user of the mobile terminal device 1 during the processing at a time of receiving the connection message from the mobile terminal device by referring to the sponsor database 81, and carries out the above described processing when such a sponsor exists.

Note that in this case, the push data may also be registered in the sponsor database 81 similarly as described above.

Next, the exemplary case of caching by predicting the moving of the premier user will be described.

In the case where the premier user receives the service while moving among a plurality of wireless cells, the connected cell will be changed sequentially. In the above, the connected cell ID is notified from the mobile terminal device 1 to the management device 8 at a time of moving between cells by the user and the management device 8 controls the cache servers in response to this, but it is also possible to introduce a function for predicting the moving before the user actually moves between the cells, and caching WWW page data for this user in advance into one or a plurality of cache servers that are candidate moving targets.

First, this prediction can be made at the mobile terminal device 1 side. In this case, the mobile terminal device 1 monitors the electric signal intensity with respect to a plurality of wireless cells regularly and predicts that it is moving to one wireless cell among the wireless cells other than the currently connected wireless cell for which the electric signal intensity exceeds a prescribed range. Then, the mobile terminal device 1 notifies a moving prediction message containing an ID of the predicted moving target wireless cell. Upon receiving this, the management device 8 commands the cache server 3 associated with that wireless cell to cache the WWW page data of that premier user, so as to be able to deal with the moving of the premier user into that wireless cell.

Note that the management device 8 may issue the cache command with respect to the predicted cache server, or issue a command with respect to the current cache server for copying the WWW information to the predicted cache server.

In this way, it is possible for the premier user to receive the cache service immediately when the connection to that wireless cell is made.

Note that when the moving message is notified from the mobile terminal device 1 and it is ascertained that the user has actually moved to the predicted wireless cell, it is possible to issue a command for deleting the cached data for this premier user to the original cache server 3 either immediately or after an elapse of a prescribed period of time. Also, when the moving message is notified from the mobile terminal device 1 and it is ascertained that the user has actually moved to a wireless cell different from the predicted wireless cell, it is possible to carry out the above described processing at a time of receiving the moving message while issuing a command for deleting the cached data for this premier user to the predicted cache server 3 either immediately or after an elapse of a prescribed period of time. Also, when the moving message is not notified from the mobile terminal device 1 even after a prescribed period of time has elapsed since the moving prediction message was notified, it is possible to issue a command for deleting the cached data for this premier user to the predicted cache server 3.

On the other hand, it is also possible to make this prediction on the management device 8 side. In this case, the management device 8 maintains logs on changes of the connected cell IDs of the mobile terminal device 1, and predicts the next connected cell of the mobile terminal device 1 from the logs. Thereafter the processing similar to the above can be carried out.

It is to be noted that the basic service form/configuration and the modified service form/configuration as described above may be realized in any suitable combination.

Now, the information delivery scheme of the present invention is applicable not only to the case of the Internet connection via a single public network such as conventionally used cellular phone or PHS network, but also to a network configuration in which the information delivery service is to be provided by operating a plurality of networks compositely.

Figure 22:
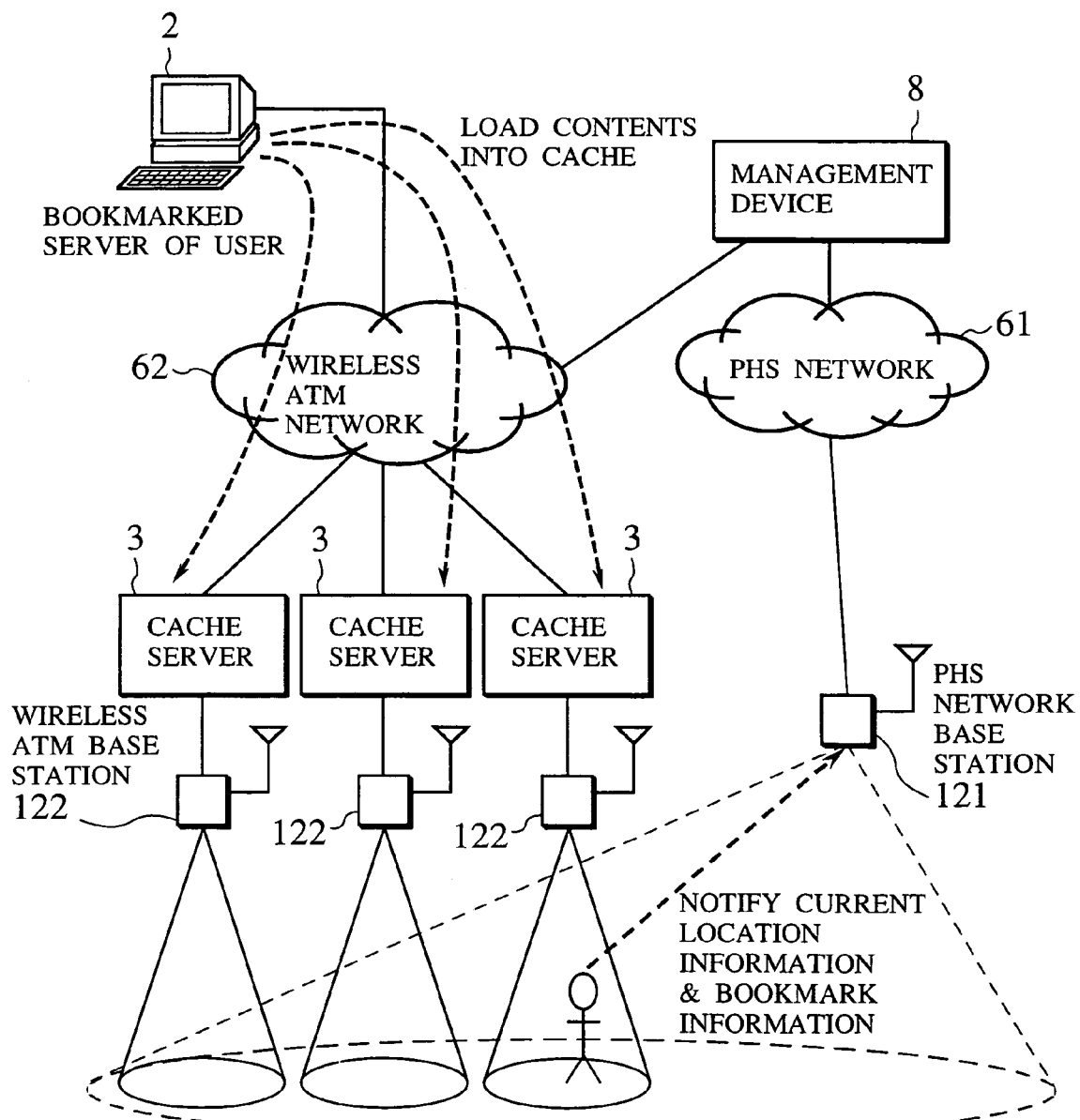
FIG. 22 is a diagram showing another exemplary overall configuration of an information delivery system according to one embodiment of the present invention.

FIG. 22 shows an exemplary composite network configuration obtained by combining a relatively low speed network and a relatively high speed network which provides at least a data transfer in a downlink direction. In this example, the former network is provided by a PHS network which is relatively low speed but covering a wide area, while the latter network is provided by a wireless ATM network which is relatively high speed but covering only data transfer in the downlink direction within a narrow spot-like area.

The low speed link is used for the transmission of the uplink control information and the acknowledge packet, while the multimedia contents from the WWW server 2 are delivered by the high speed downlink.

It is assumed that a plurality of cache servers 3 are provided in a middle of the high speed downlink for providing the spot service. FIG. 22 shows an exemplary case where the cache server 3 is provided in association with each wireless ATM base station 122.

In such a network configuration, when the service with respect to the premier users is to be provided, the information such as the user ID of the mobile terminal device 1 connected to the network and the Bookmark information of the WWW browser on the mobile terminal device 1 is transferred to the management device 8 via the low speed uplink (provided by a PHS network base station 121 in FIG. 22). The management device 8 searches out the nearby cache server according to the connected cell ID given from the user. Here, in the case where the service area of each spot service is narrow as in the example of FIG. 22, it is possible to search but not just the closest cache server but also a plurality of nearby service spots, and control all these cache servers to cache, and it is also possible to control the number of cache servers to be selected according to the class (or the premier level) of the user. The processing for caching the WWW contents into the selected cache server group can be realized using the high speed downlink.

Note that the data transfer from the mobile terminal device 1 to the WWW server 2 can be realized via the low speed uplink, and the data transfer from the cache server 3 to the mobile terminal device 1 can be realized via the high speed downlink.

As described, according to this embodiment, in the case of providing the information delivery service using the mobile terminal device, data can be cached at a higher priority into the cache server belonging to a wireless region in which a specific information provider wishes to provide information at higher than normal speed, such that a high speed data service can be provided to a user who entered into that wireless region. In this way, the information provider can realize a more effective information providing service that can achieve a higher advertisement effect.

Also, when a specific information delivery service user is connected to the network, the preferred WWW pages of this user can be cached into the nearby cache server at a higher priority according to the past WWW access log information of this user, such that this user can receive the service more comfortably as the information delivery can be realized at higher than normal speed for this user.

Such specific information providers or specific users can be flexibly controlled within the management device as the premier sponsors or premier users, such that it is possible to realize a control by which a plurality of classes are set for the premier sponsors and the amount of WWW contents to be cached are changed or the update frequency is changed according to the classes, or a plurality of classes are set for the premier users and the number of WWW pages to be cached is changed according to the classes, for example. Consequently, it becomes possible to realize broad settings for the information delivery service, and it becomes possible to realize appropriate resource distribution according to the amount of resources in the wireless network.

In summary, the conventional Web page caching scheme has been actually ineffective in making the Web access faster unless the cached page is accessed very frequently because all the user accesses are treated equally.

However, in the system where the information delivery service is received using a wireless network connected mobile computer, there can be cases where it is desired to receive geographically relevant information at higher speed during seamless movements using wireless network. For example, in the case of moving through some shopping district, it is desired to receive information sent out by stores belonging to that shopping district at higher speed. In this case, from a viewpoint of those who are providing information, if the own information is cached in the nearby cache server, a response to the user can be made faster so that the advertisement effect or the appealing effect can be improved. On the other hand, from a viewpoint of the user of the mobile computer, there can be cases where it is desired to cache highly likely accessed Web pages at a higher priority according to the preference of the user of the wireless network connected mobile computer.

In the present invention, when the mobile computer of a specific user (premier user) is connected to the network, the WWW Information that is highly likely accessed by the user is prefetched and cached into the closest cache server. Also, the WWW information of a specific information provider (premier sponsor) is constantly maintained in the cache server contained in a specific geographic region specified by the contract condition or the like, and preferably updated to the latest information in every prescribed period of time.

With such a control, even for the mobile computer that is connected to the wireless network with a low transmission rate, the accesses to the WWW information of the specific information provider who wishes to provide information in a specific area can be made faster when the mobile computer moves into that specific area. Also, for the specific user who wishes to have fast responses even during the wireless connection, the WWW information of the specific user can be cached according to the access log information or the preference information of that user, such that the response can be made faster and therefore the information service can be received more comfortably.

It is also effective to allocate a prescribed amount (a whole or a part) of the finite memory capacity of the cache server at a higher priority, to the specific information providers (premier sponsors), or to the specific users (premier users), or to the specific information providers (premier sponsors) and the specific users (premier users).

Thus according to the present invention, the prescribed WWW information for the mobile computer is cached into the cache server nearby the mobile computer that is determined according to a notification from the mobile computer, so that it is possible to realize effective caching with respect to specific users who make mobile accesses using the mobile computers.

Also, according to the present invention, the prescribed WWW information specified from an information provider who provides WWW information from an information server is cached at a higher priority into one or a plurality of cache servers located in the prescribed geographic range related to the information provider which is specified from the information provider, so that it is possible to realize effective caching with respect to mobile access users located at locations specified by specific information providers.

It is to be noted that the above described embodiments are directed to the case in which all the premier sponsors and their nearby cache servers, as well as the network connection locations of all the premier users and their nearby cache servers are managed by the management device in a centralized manner, and the cache servers acquires the WWW data in response to commands issued from the management device. However, if the cache server has sufficient processing performance and memory capacity, it is possible to distribute a part of the processing of the management device to the cache server side so as to realize the autonomous processing at the cache server.

For example, in the processing for the premier sponsor, the management device can select cache servers corresponding to the premier condition in advance, and gives information such as the WWW server locations (addresses, data update frequency, etc., to these cache servers such that the cache servers can carry out the autonomous control by themselves. In such a case, the cache server can have a configuration obtained by combining a configuration shown in FIG. 6 and a configuration shown in FIG. 12, for example.

Also, in the processing for the premier users, there may be a practical problem regarding how much of the user ID matching processing can be distributed, but it is still possible to judge the premier class of the user at a regional server and realize the autonomous control of the WWW information to be cached according to the classes at the cache server side. This is particularly effective for the user management in the case of dealing with the residential applications at home in addition to the moving mobile users, where the improvement of the system performance by reducing the data traffics between each terminal and the central management device can be expected by carrying out the distributed management of the user information for a certain range of users at the regional management server.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the mobile terminal device, the cache server, and the management device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMS, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An information delivery system for delivering WWW information provided by information servers on Internet to mobile computers connected to the Internet through a wireless network, comprising:

a plurality of cache servers provided in association with the wireless network and configured to be capable of caching WWW information provided by the information servers; and a management unit configured to manage caching state of the cache servers, by receiving a message indicating at least a connected location of a particular mobile computer in the wireless network from the particular mobile computer, selecting one or more cache servers located nearby the connected location of the particular mobile computer according to the message, and controlling said one or more cache servers to cache selected WWW information specifically selected for the particular mobile computer, so as to enable faster accesses to the selected WWW information by the particular mobile computer at the connected location, wherein the particular mobile computer sends the message containing a user ID of a user of the particular mobile computer; and the management unit registers in advance a correspondence between a user ID of each user of each mobile computer and one or more information provider IDs of those information providers who wish to provide services to said each user and a correspondence between each information provider ID of each information provider and one or more WWW information IDs of those WWW information which are to be provided by said each information provider, searches the information provider IDs registered in correspondence to the user ID contained in the message, searches the WWW Information IDs registered in correspondence to each information provider ID found by a search, and controls said one or more cache servers to cache WWW information having the WWW information IDs found by a search as the selected WWW information.

* * * * *